(12) United States Patent
Duschl et al.

(10) Patent No.: US 11,718,426 B1
(45) Date of Patent: Aug. 8, 2023

(54) HIGHLY ADAPTABLE PLATFORM

(71) Applicant: UNITED LAUNCH ALLIANCE, L.L.C., Centennial, CO (US)

(72) Inventors: Steven F. Duschl, Melbourne, FL (US); Daniel P. Norfolk, Rockledge, FL (US); Mark J. Dornseif, Indialantic, FL (US)

(73) Assignee: UNITED LAUNCH ALLIANCE, L.L.C., Centennial, CO (US)

( * ) Notice: Subject to any disclaimer, the term of this patent is extended or adjusted under 35 U.S.C. 154(b) by 261 days.

(21) Appl. No.: 17/332,097

(22) Filed: May 27, 2021

Related U.S. Application Data

(60) Provisional application No. 63/031,819, filed on May 29, 2020.

(51) Int. Cl.
  *B64G 5/00* (2006.01)
(52) U.S. Cl.
  CPC ...................... *B64G 5/00* (2013.01)
(58) Field of Classification Search
  CPC .................................. B64G 5/00; B64G 1/002
  USPC ...................................................... 244/171.6
  See application file for complete search history.

(56) References Cited

U.S. PATENT DOCUMENTS

| | | | | |
|---|---|---|---|---|
| 4,690,246 A | * | 9/1987 | Hornagold | B66F 11/046 182/19 |
| 4,727,959 A | | 3/1988 | Kummer | |
| 4,759,437 A | * | 7/1988 | Bevins | B64F 1/324 5/430 |
| 5,375,283 A | | 12/1994 | Silberman | |
| 5,423,396 A | | 6/1995 | Fahrion | |
| 5,685,392 A | | 11/1997 | Phillips et al. | |
| 5,701,704 A | | 12/1997 | Landes | |

(Continued)

FOREIGN PATENT DOCUMENTS

| | | |
|---|---|---|
| KR | 10-1805401 | 1/2018 |
| WO | WO 95/07232 | 3/1995 |

OTHER PUBLICATIONS

Linda Herridge, Final Work Platform Installed in Vehicle Assembly Building for NASA's Space Launch System, Feb. 9, 2017, NASA (https://www.nasa.gov/feature/final-work-platform-installed-in-vehicle-assembly-building-for-nasas-space-launch-system) (Year: 2017).*

(Continued)

*Primary Examiner* — Tien Q Dinh
*Assistant Examiner* — Nevena Aleksic
(74) *Attorney, Agent, or Firm* — Sheridan Ross P.C.

(57) ABSTRACT

Systems and methods are disclosed for servicing objects such as a launch vehicle or an aircraft with an elevated platform that conforms to differently sized and shaped objects. The platform can have telescoping planks that extend to conform to the outer surface of the object. Glide pads with low friction surfaces, rollers, etc. can reduce the friction between a plank and a supporting surface and between adjacent planks such that planks can be manually moved into position. In addition, the plank holders can limit the planks to a linear movement, secure the planks to a supporting surface, and control the friction force between the planks and the supporting surface. Further still, the supporting surface can be a carrier and/or a support that moves the planks closer to the object and tilts the planks out of the way so that an object can be positioned within the platform.

20 Claims, 16 Drawing Sheets

(56) References Cited

U.S. PATENT DOCUMENTS

| | | | |
|---|---|---|---|
| 6,782,665 B2 | 8/2004 | Fahrion | |
| 7,228,939 B1 | 6/2007 | Prater | |
| 8,499,889 B2 | 8/2013 | DuBose et al. | |
| 9,441,382 B2 | 9/2016 | Hokanson et al. | |
| 11,441,321 B2 * | 9/2022 | Fleming | B64F 5/40 |
| 2008/0127578 A1 | 6/2008 | Dowe | |
| 2009/0301813 A1 | 12/2009 | Chantelois et al. | |
| 2012/0036700 A1 * | 2/2012 | Mun | B64F 5/10 |
| | | | 182/62.5 |
| 2012/0056364 A1 * | 3/2012 | DuBose | E04G 1/15 |
| | | | 29/559 |
| 2015/0166198 A1 * | 6/2015 | Hokanson | E06C 1/12 |
| | | | 182/101 |
| 2016/0186450 A1 | 6/2016 | Watson | |
| 2020/0270107 A1 * | 8/2020 | Hokanson | E04G 1/18 |

OTHER PUBLICATIONS

"747 Engine Maintenance Dock," MP Industries, 2 pages [retrieved online on Jul. 2019, from: www.industrialmaintenanceplatforms.com/products/aircraft/engine-maintenance-stands/747-engine-maintenance-dock].

"A350 Main Landing Gear Access," SafeSmart Aviation, 4 pages [retrieved online on Jul. 2019, from; www.safesmartaviation.com/main-landing-gear-access].

"Aircraft Docking Access Nose to tail Docking system," Business2Dubai, Jun. 14, 2017, 4 pages [retrieved online from: business2dubai.wordpress.com/2017/06/14/aircraft-docking-access-nose-to-tail-docking-system/].

* cited by examiner

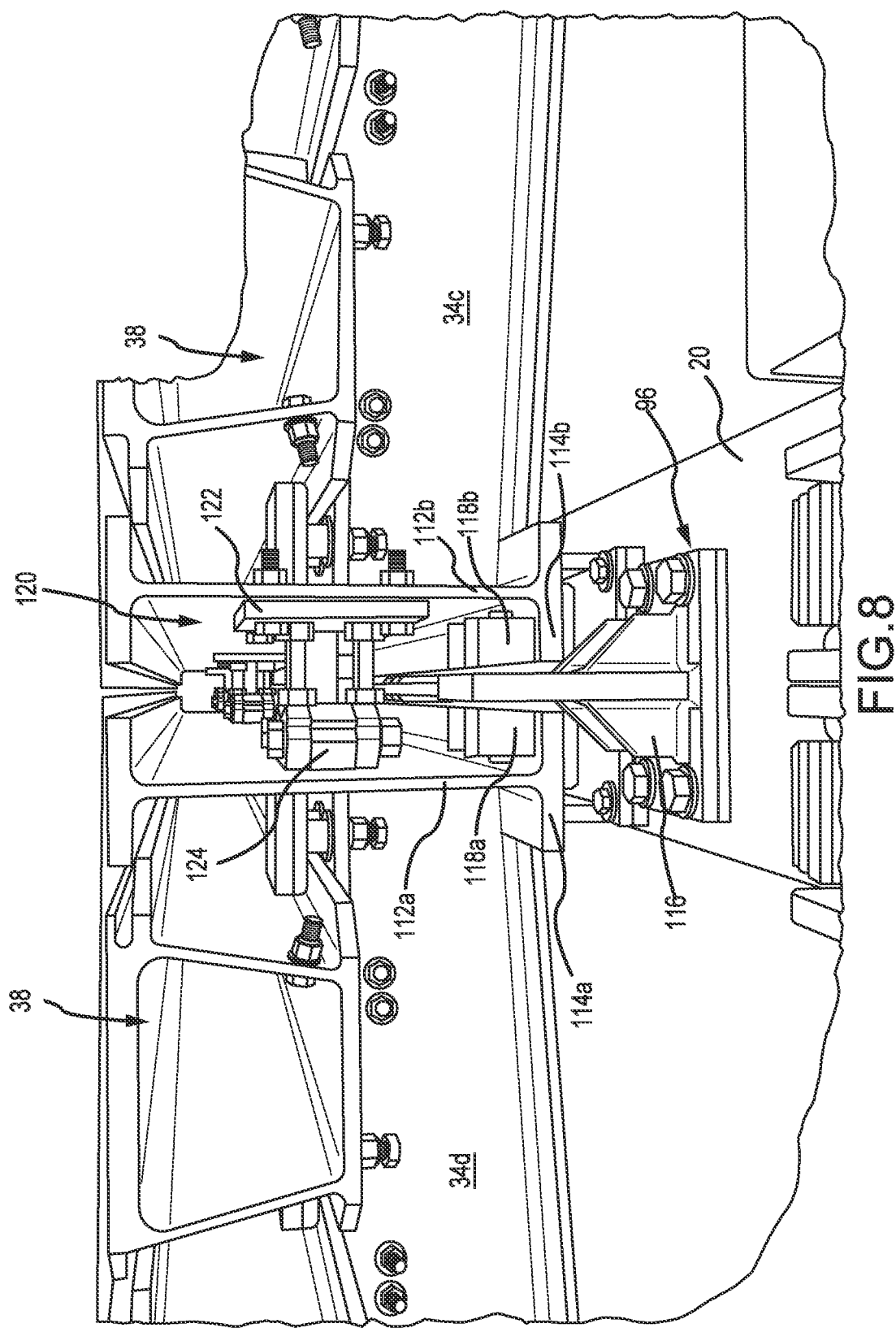

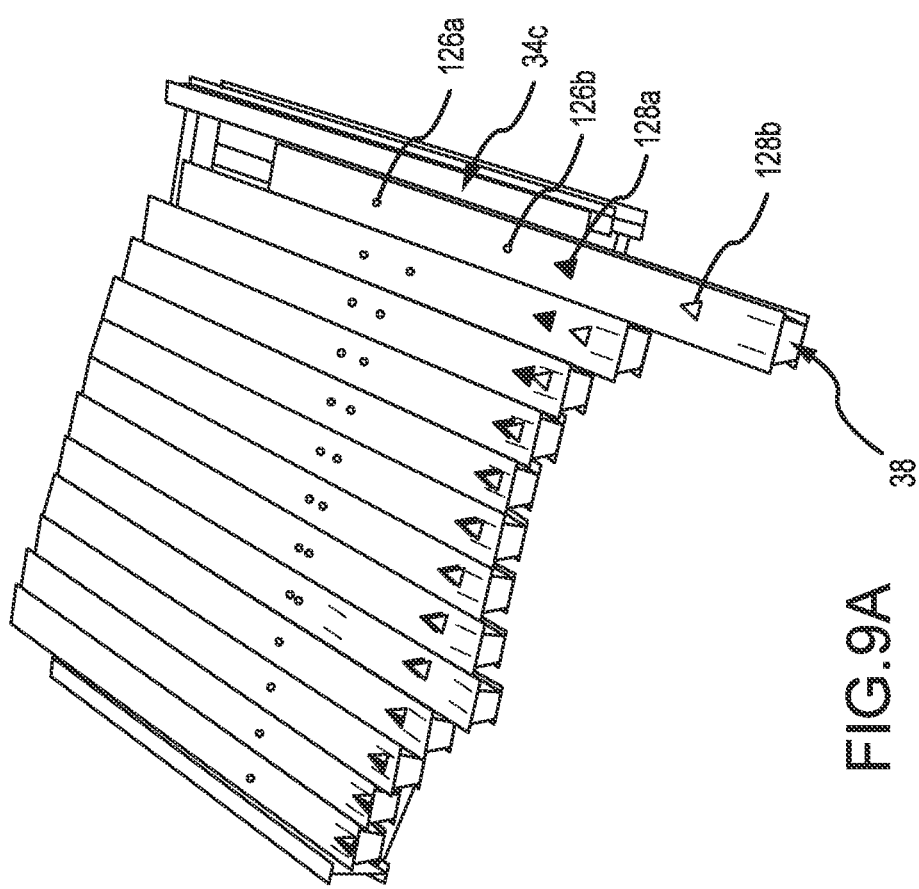

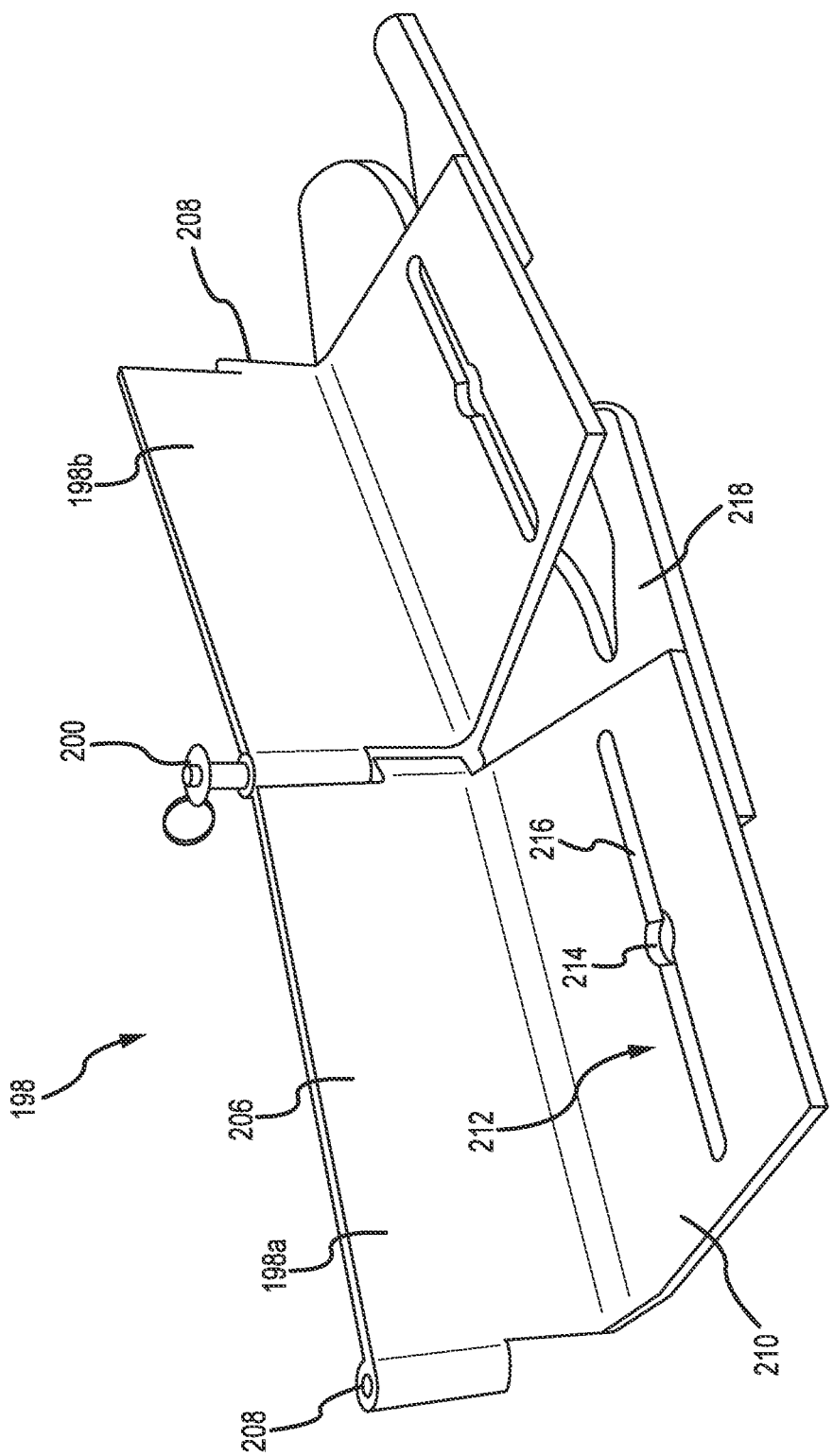

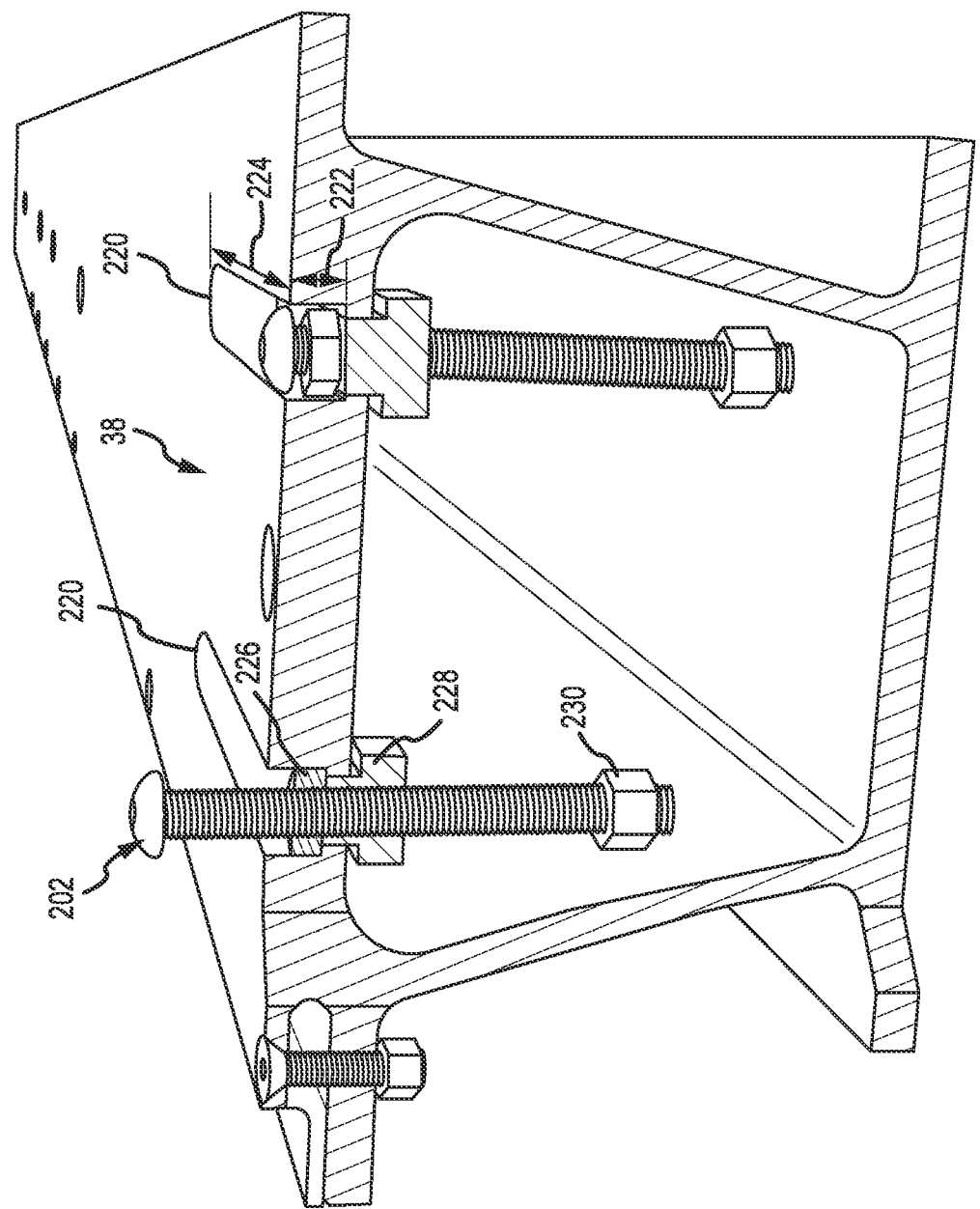

HIGHLY ADAPTABLE PLATFORM

CROSS-REFERENCE TO RELATED APPLICATION

This application claims the benefit of priority from U.S. Provisional Patent Application Ser. No. 63/031,819, filed May 29, 2020, entitled "HIGHLY ADAPTABLE PLATFORM," the entire disclosure of which is hereby expressly incorporated by reference in its entireties.

FIELD OF THE INVENTION

The present disclosure generally relates to elevated platforms that are used to service large objects such as a launch vehicle or aircraft. More specifically, the present disclosure relates to systems and methods for conforming a platform to differently sized or shaped objects. Telescoping planks extend from a carrier of the platform to reach the surface of the object and provide a substantially continuous surface surrounding all or a portion of the object.

BACKGROUND OF THE INVENTION

A launch vehicle typically has multiple stages. In a serial arrangement, a first stage initially propels the launch vehicle from a launch pad until a predetermined altitude or until the first stage runs out of propellant. Then, the launch vehicle jettisons the first stage, and a second or upper stage propels a payload to a second location. When the first stage is jettisoned, the second stage no longer has to propel the mass of the first stage. Thus, each stage can be specifically designed for different aerodynamic conditions. For instance, the first or lower stage can be larger to propel the launch vehicle through a denser atmosphere whereas the second or upper stage can be designed to propel the launch vehicle through a less dense atmosphere, into the vacuum of space, and to the destination.

A launch vehicle can also include one or more booster rockets in a parallel arrangement with the first or lower stage. The boosters augment the thrust of the first stage of the launch vehicle during liftoff from the launch pad. The boosters help propel the launch vehicle until the boosters run out of propellant, at which point the boosters are jettisoned. Then the launch vehicle continues flight without the mass of the boosters. These stages and boosters along with other components such as a spacecraft for payload, cargo and/or humans are assembled together before launching the vehicle.

The launch vehicle is typically assembled in a vertical processing facility to protect the vehicle from inclement weather, temperature variations, moisture, and other environmental considerations. Cranes and other equipment manipulate the components of the launch vehicle relative to each other for assembly. Various platforms are arranged in the vertical processing facility to allow personnel to work on the launch vehicle. Multiple platforms can be arrayed in the vertical processing facility at different heights or levels so that personnel simultaneously may work on different parts of the launch vehicle and its components.

In current practice, a platform in the vertical processing facility typically has one portion that is a permanently or semi-permanently fixed structure. This portion defines a portion of a rough opening to accommodate the components of the launch vehicle for assembly. An overhead crane or hoist positions additional platform sections which enclose the opening. Launch vehicle components are lowered into the opening. To accommodate movement and positioning of the components, a large space or gap nonetheless still exists between the edge of the platform and the exterior surface of the launch vehicle. Additional platform portions or sections horizontally extend the platform to the outer surface of the launch vehicle to close the gap. The location of at least some of these portions corresponds to the location of a booster. The portions are removed to accommodate each booster as it is moved into place and attached to the launch vehicle. Once fully assembled, platforms must be removed to permit the launch vehicle to exit the vertical processing facility and move to the launch pad for launch.

There are inherent limitations with this system of platform portions. Platform portions are configured to accommodate a specific launch vehicle configuration. For example, an Atlas V launch vehicle has a certain cross sectional shape and size, and between zero and five boosters can be connected to the first stage of the Atlas V launch vehicle. A specific quantity of platform portions is designed and constructed to accommodate this launch vehicle. A different quantity of platform portions is designed to accommodate each configuration of zero, one, two, three, four, and five boosters. In comparison, a Vulcan launch vehicle has a different cross sectional shape and size than that of the Atlas V, and up to six boosters can be connected to the first stage of the Vulcan launch vehicle. Therefore, a completely different quantity of platform portions is needed to accommodate this launch vehicle and its various booster configurations. As a result, a large inventory of differently configured platform portions must be maintained. When a vertical processing facility switches from assembling a first type of launch vehicle to a second type of launch vehicle, the system of platform portions must be removed, stored and replaced with a differently configured system of platforms. This extensive replacement process limits the turnaround time between launches.

As a reference, the turnaround time between launches for the Space Shuttle was on the order of months. With increased demand for more commercial launches and with improved methods of recovering and reusing first stages and boosters, demand is mounting to decrease the time between launches. Therefore, there is a need to improve and accelerate the assembly of launch vehicles and thereby reduce platform replacement turnaround times.

In addition, positioning of the platform portions can present safety issues to personnel and even damage the launch vehicle. Each platform portion is moved in and out of position with the use of a crane. A moving platform portion can injure personnel and damage the launch vehicle. Using existing platform systems while attempting to accommodate shorter turnaround times and more frequent launches presents more opportunities to injure personnel or damage the launch vehicle.

SUMMARY OF THE INVENTION

In accordance with aspects of the present disclosure, systems, methods and sub-systems or sub-combinations are provided to quickly conform a platform system to different launch vehicles and booster configurations to accommodate faster turnaround times. In addition, platform systems of the present disclosure transition between different types of launch vehicles without the use of cranes or hoists. Thus, embodiments of the present disclosure are safer and less likely to damage personnel or objects within the vertical processing facility including the launch vehicle.

According to some aspects of the present disclosure, a platform system for a vertical processing facility has supports and carriers that position telescoping planks proximate to a launch vehicle where the telescoping planks can be extended or moved to conform to different sizes and shapes of launch vehicles and different booster configurations. A support extends partially into a vertical processing facility, and the support rotates between a deployed generally horizontal position and a raised position. When in the raised position, a launch vehicle and/or components of a launch vehicle may be moved laterally into an opening of the platform system. The platform system includes one or more carriers that move toward or away from the launch vehicle. This movement can be electrically powered or manually powered by, for example, a hand crank. Planks telescope from an initial, retracted position where a majority of the plank is positioned within the interior space of a carrier to an extended position where at least a portion of the plank is positioned outside of the interior space of the carrier. The planks, carriers, and supports form a substantially continuous surface up to the exterior of the launch vehicle to allow personnel to work on the launch vehicle. The platform system can accommodate different vehicles and booster configurations by simply moving or repositioning the carriers and/or planks. As a result, the platform system significantly reduces the turnaround time between launches of different vehicles and different booster combinations. In addition, various features described in more detail below improve the safety of personnel and reduce the likelihood of damage to the launch vehicle.

According to further aspects of the present disclosure, telescoping planks form a substantially continuous surface up to a launch vehicle while being movable between positions. A plurality of planks is positioned in an interior space of a carrier such that longitudinal dimensions of the planks are aligned in the same direction, and the planks are positioned adjacent to each other. When viewed in cross section, one embodiment of a given plank has a top plate and a bottom plate joined together by sidewalls. A flange extends from underneath an edge of the top plate, and the flange overlaps an edge of an adjacent plank so that the plurality of planks forms a substantially continuous surface up to the launch vehicle. In some embodiments, a friction-reducing material is positioned on an upper surface of the flange or the lower surface of the top plate of an adjacent plank to reduce friction between adjacent planks when moving between positions and to facilitate the manually movable nature of the planks. With a substantially continuous surface, loose fasteners or other materials cannot fall through the platform and injure personnel or damage equipment.

When viewed in cross section, the bottom plate extends between two edges, yet the bottom plate of a plank does not overlap the bottom plate of an adjacent plank. As a result, there is an offset between bottom plates of adjacent planks, which allows space for a plank holder to extend from a carrier, through the offset, and secure the planks to the carrier and limit the movement of the plank to a linear movement. The plank holder among other features described in further detail below help facilitate the manually movable nature of the planks and also reduce the likelihood of any injury to personnel or damage to equipment during a transition between launch vehicles and/or booster configurations.

According to some aspects of the present disclosure, a single roller and at least one glide pad are positioned on a carrier beneath the bottom plate of a plank to allow the plank to be manually moved into position relative to a launch vehicle. The glide pad is made of a material that reduces the friction between the lower surface of the bottom plate of the plank and a surface of the carrier, and the glide pad is positioned proximate to the plank holder so that any force exerted by the plank holder on the plank does not cause the plank to seize against the carrier. The roller allows for more free movement between the plank and the carrier. Together, the single roller and at least one glide pad provide enough friction to maintain control of plank movement and to keep a plank from moving too quickly toward a launch vehicle and causing damage to the vehicle. Yet this configuration also allows the plank to be manually moved into position without the need for a hoist or other tools, which improves the overall safety of personnel working with the platform system. It should be appreciated that more than one roller and more than one glide pad may be associated with a plank.

According to various aspects of the present disclosure, the plank holder has features to adjust the contact forces between a friction-reducing material on the underside of the pad and the bottom plates of the planks. As an example of a friction reducing feature, two bolts extend through the plank holder, and the bolts can be rotated to adjust the height of the pad and friction-reducing material over or against the bottom plates. Lock nuts fix the bolts in place, and washers brace the bolts against off-axis forces. The plank holder can be set off of the bottom plates of the planks to guide the planks in a linear direction and prevent planks from cantilevering and falling out of the carrier. In addition, the plank holders can contact the bottom plates to introduce a friction force between the plank holders and the bottom plates of the planks and to change the friction forces between the lower surfaces of the planks and roller and glide pads underneath the plank. Thus, personnel can tune the movement of the planks relative to the carrier to reduce the likelihood of injury to personnel and damage to equipment in the vertical processing facility.

According to some aspects of the present disclosure, rollers and drive shafts move carriers relative to a support. The carriers move relative to the support to accommodate different configurations of launch vehicles and boosters, and in some embodiments, two or more carriers move relative to a support. A series of rollers bear the weight of the carriers when the support is in the lowered, horizontal position. Two drive shafts extend along the length of the support where one drive shaft moves one carrier and another drive shaft moves another carrier. Each shaft has at least one pinion that engages a corresponding rack on the underside of a carrier, and rotation of the drive shaft rotates the pinions, which moves the rack and the carrier relative to the support. A gearbox is provided for each shaft, and due to regulations regarding power sources within the vertical processing facility, a handheld device, such as a small drill, engages the gearbox to provide power and rotate the drive shafts. It will be appreciated that in various embodiments, a hand-powered crank can be used to power and rotate the drive shafts. Alternatively, a fixed motor with an output connected to the drive shaft can power rotation of the drive shaft. The same or similar drive shafts can be used with stationary or fixed supports that do not raise and lower, or otherwise move.

Hold-down brackets and cam followers keep the carriers secured to the support and the pinions and racks engaged with each other when the support and carriers move from the horizontal position to a raised position and in the raised position. In some embodiments, the raised position may be a vertical or nearly vertical position. Rollers on a distal end of one of the hold-down brackets are positioned to engage the upper surface of a flange from each plank carrier. An alignment roller is positioned between two carriers to maintain alignment between adjacent carriers, in particular when the support rotates from a horizontal position to a raised position. An alignment body is fixed to one side of one carrier, and one or more rollers positioned at a distal end of the alignment body engage one side of another carrier. Thus, the carriers move relative to each other with minimal resistance, and the distance between two carriers is maintained.

According to further aspects of the present disclosure, a segmented endplate system is provided for use with the planks regardless of the final position of the planks. The endplates work with any launch vehicle or booster combination as opposed to previous endplates, which only worked with a platform insert system for specific launch vehicle and booster combinations. The telescoping planks extend to different lengths relative to a carrier to conform to the size and shape of a particular launch vehicle and booster configuration. Once the planks are fixed in position relative to the carrier, a series of endplates are positioned at distal ends of the planks to provide a vertical surface that more closely conforms to the outer surface of the launch vehicle and prevents tools, debris, and other materials from falling off of the platform.

The series of endplates comprises individual endplates, which have a vertical portion and a horizontal portion. Connectors, for example, pins join adjacent endplates together, and the horizontal portion of each endplate has at least one slot to receive a captive bolt from a telescoping plank. Each slot has one section of larger diameter to receive a head of a bolt, and the remaining sections have a smaller diameter so the bolt head can engage the horizontal portion of the endplate and secure the endplate to the plank. The captive fastener or bolts in each telescoping plank can move between a retracted position where the fastener does not extend above the upper surface of the plank and an extended position where the fastener extends above the upper surface of the plank to engage an endplate. In some embodiments, the fastener is a bolt that has a lock nut at a bottom end to keep the bolt retained within the slot of the plank, and the bolt has a thin nut and a T-nut that the bolt rotates within to adjust the height of the bolt and move the bolt between the retracted and extended positions.

According to some aspects of the present disclosure, a lift or pivoting system secures a platform support in a horizontal position and raises the support to a retracted or raised position. When in the raised position, a pathway is created through the platform system to allow a launch vehicle and/or launch vehicle components to move laterally or horizontally through the pathway and into an opening defined by one or more supports, carriers, and/or planks. Once the launch vehicle is positioned within the opening, the lift system can lower the support into the horizontal position to enclose the launch vehicle, which allows personnel to reposition carriers and planks for access to the launch vehicle.

The support can be rotatable about an axis, and a pair of hydraulic cylinders rotate the support about the axis and move the support between a substantially horizontal position in the pathway and a raised or substantially vertical position or any position in between these states. In one embodiment, one end of the hydraulic cylinders is rotatably attached to the support, and an opposing end of the hydraulic cylinders is rotatably attached to part of the platform or vertical processing facility at a location below the support.

The lift system can also have a pair of links that hold the support in the horizontal position and also stow away when the support is lifted in the vertical position to provide the maximum possible clearance for the recess to receive a launch vehicle. Like the hydraulic cylinders, one end of the links is rotatably attached to the support, and an opposing, free end of the links is rotatably attached to part of the platform or vertical processing facility at a location below the hydraulic cylinders. Once the hydraulic cylinders lower the support into the deployed or horizontal position, pneumatically actuated pins secure the free ends in place. When the hydraulic cylinders raise the support, the free ends of the links are released, and the links freely rotate relative to the support. The hydraulic cylinders continue to raise the support into a vertical orientation where the hydraulic cylinders and the links are received within recesses of the support, and the hydraulic cylinders and the links do not extend past a lowermost surface of the support to provide the maximum possible clearance to receive a launch vehicle One aspect of embodiments of the present disclosure is to provide an adjustable platform system for use in assembly of a launch vehicle, comprising a rotatable support, wherein the support rotates about an axis of rotation between a first raised position and a second horizontal position, the rotatable support having a first end proximate the point of rotation and a second end spaced from the first end; a first carrier connected to the support and defining a first interior space, wherein the first carrier moves relative to the support in a direction that is substantially parallel to the axis of rotation; a first plurality of planks connected to the first carrier, each plank having a first end and an opposite second end and a top plate extending between the first end and the second end defining a longitudinal axis, the top plate having an upper surface and a first edge and a second edge spaced from the first edge and the first and second edges are parallel to the longitudinal axis, a flange disposed below the second edge of the top plate and extending laterally outwardly beyond the second edge of the top plate, the flange having an upper surface and extending between the first end and the second end; wherein the planks in the first plurality of planks are aligned in a row with each plank in the first plurality of planks adjacent to at least one other plank with the longitudinal axis of each plank being parallel, the first edge of the top plate of at least one plank in the first plurality of planks overlaps the flange of the adjacent plank wherein a substantially continuous surface is formed between the upper surface of the top plate and the upper surface of the flange of the adjacent plank; and wherein each plank of the first plurality of planks moves relative to the carrier in a direction that is substantially parallel to the axis of rotation between a first retracted position wherein at least a majority of the plank is positioned in the first interior space and a second extended position wherein at least a portion of the plank extends beyond the first interior space.

In some embodiments, the system further comprises a second carrier that is movably connected to the support, wherein the second carrier moves relative to the support in a direction that is substantially parallel to the axis of rotation; a second plurality of planks movably connected to the second carrier, each plank of the second plurality of planks having a first end and an opposite second end and a top plate extending between the first end and the second end defining a second longitudinal axis, the top plate of each of the second plurality of planks having an upper surface and a first edge and a second edge spaced from the first edge and the first and second edges are parallel to the second longitudinal axis, a flange disposed below the second edge of the top plate and extending laterally outwardly beyond the second edge of the top plate, the flange having an upper surface and extending between the first end and the second end; wherein the planks in the second plurality of planks are aligned in a row with each plank in the second plurality of planks adjacent to at least one other plank with the second longitudinal axis of each plank being parallel, the first edge of the top plate of at least one plank in the second plurality of planks overlaps the flange of the adjacent plank of the second plurality of planks wherein a substantially continuous surface is formed between the upper surface of the top plate and the upper surface of the flange of the adjacent plank; and wherein each plank of the second plurality of planks moves relative to the second carrier in a direction that is substantially parallel to the axis of rotation between a first retracted position wherein at least a majority of the plank is positioned in the second interior space and a second extended position wherein at least a portion of the plank extends beyond the second interior space.

In various embodiments, the system further comprises a non-rotatable horizontally oriented support, the non-rotatable support having a first end and a second end spaced from the first end; a third carrier and a fourth carrier connected to the non-rotatable support, the third carrier defining a third interior space and the fourth container defining a fourth interior space; a third plurality of planks movably connected to the third carrier, each plank of the third plurality of planks having a first end and an opposite second end and a top plate extending between the first end and the second end defining a third longitudinal axis, the top plate having an upper surface and a first edge and a second edge spaced from the first edge and the first and second edges are parallel to the third longitudinal axis, a flange disposed below the second edge of the top plate and extending laterally outwardly beyond the second edge of the top plate, the flange having an upper surface and extending between the first end and the second end; wherein the planks in the third plurality of planks are aligned in a row with each plank in the third plurality of planks adjacent to at least on other plank with the third longitudinal axis of each plank being parallel, the first edge of the top plate of at least one plank in the third plurality of planks overlaps the flange of the adjacent plank wherein a substantially continuous surface is formed between the upper surface of the top plate and the upper surface of the flange of the adjacent plank; wherein each plank of the third plurality of planks moves relative to the third carrier between a first retracted position wherein at least a majority of the plank is positioned in the third interior space and a second extended position wherein at least a portion of the plank extends beyond the third interior space; a fourth plurality of planks movably connected to the fourth carrier, each plank of the fourth plurality of planks having a first end and an opposite second end and a top plate extending between the first end and the second end defining a fourth longitudinal axis, the top plate having an upper surface and a first edge and a second edge spaced from the first edge and the first and second edges are parallel to the fourth longitudinal axis, a flange disposed below the second edge of the top plate and extending laterally outwardly beyond the second edge of the top plate, the flange having an upper surface and extending between the first end and the second end; wherein the planks in the fourth plurality of planks are aligned in a row with each plank in the fourth plurality of planks adjacent to at least one other plank with the fourth longitudinal axis of each plank being parallel, the second edge of the top plate of at least one plank in the fourth plurality of planks overlaps the flange of the adjacent plank wherein a substantially continuous surface is formed between the upper surface of the top plate and the upper surface of the flange of the adjacent plank, wherein each plank of the fourth plurality of planks moves relative to the fourth carrier between a first retracted position wherein at least a majority of the plank is positioned in the fourth interior space and a second extended position wherein at least a portion of the plank extends beyond the fourth interior space; and wherein when the first support is in the second horizontal position the first and second carriers are substantially co-planar with the third and fourth carriers and an opening is formed between the first and second carriers and the third and fourth carriers.

In some embodiments, the top plate of each plank has an upper surface and a lower surface, and wherein a friction-reducing material is disposed on either the lower surface of each top plate proximate the first edge or the upper surface of each flange. In various embodiments, each plank of the first plurality of planks comprises a bottom plate spaced from the top plate and extending between the first end and the second end of each plank, the bottom plate having a first edge and a second edge spaced from the first edge, the first and second edges parallel to the longitudinal axis, the bottom plate having an upper surface and a lower surface, and further comprising: a plank holder secured to the first carrier, wherein the plank holder contacts the upper surface of the bottom plate of a first plank of the first plurality of planks and contacts the upper surface of the bottom plate of a second plank of the first plurality of planks to secure the first and second planks to the carrier and limit the movement of the first and second planks relative to the carrier to a linear movement.

In some embodiments, the system further comprises a first glide pad affixed to the first carrier and positioned beneath the bottom plate of the first plank of the first plurality of planks, wherein the glide pad interfaces with the lower surface of the bottom plate and reduces friction between the first carrier and the first plank of the first plurality of planks when the first plank moves between the first retracted position and the second extended position. In various embodiments, the system further comprises a first plank roller affixed to the first carrier and positioned beneath the bottom plate of the first plank of the first plurality of planks, wherein the first plank roller rotatably supports the first plank as the first plank moves between the first retracted position and the second extended position.

Another aspect of embodiments of the present disclosure is to provide an adjustable platform system for use in assembly of a launch vehicle, comprising: a first carrier having an upper surface and defining a first interior space, the first carrier affixed to a first support wherein the top surface of the first carrier is substantially horizontal, and the first carrier moves relative to the first support in a substantially horizontal plane; a first plurality of planks connected to the first carrier, wherein each plank of the first plurality of planks moves relative to the first carrier between a first retracted position wherein at least a majority of the plank is positioned in the first interior space and a second extended position wherein at least a portion of the plank extends beyond the first interior space; a second carrier having an upper surface and defining a second interior space, the second carrier affixed to a second support wherein the upper surface of the second carrier is substantially horizontal and is substantially co-planar with the upper surface of the first carrier, and the second carrier moves relative to the second support in the same substantially horizontal plane; wherein the first support and the second support are spaced apart, and wherein an opening exists between the first and second carriers; a second plurality of planks connected to the second carrier, wherein each plank of the second plurality of planks moves relative to the second carrier between a first retracted position wherein at least a majority of the plank is positioned in the second interior space and a second extended position wherein at least a portion of the plank extends beyond the second interior space; and wherein the first carrier and the second carrier move in a horizontal direction toward and away from each other to change the size of the opening, and wherein the first plurality of planks and the second plurality of planks move in the same horizontal direction to further change the size of the opening.

In some embodiments, the system further comprises a third carrier having an upper surface and connected to the first support adjacent the first carrier and defining a third interior space, wherein the upper surface of the third carrier is substantially horizontal and co-planar with the upper surface of the first carrier and moves relative to the first support in the same substantially horizontal plane and is co-planar with the movement of the first carrier; and a third plurality of planks connected to the third carrier, wherein each plank of the third plurality of planks moves relative to the third carrier between a first retracted position wherein at least a majority of the plank is positioned in the third interior space and a second extended position wherein at least a portion of the plank extends beyond the third interior space.

In various embodiments, the system further comprises a fourth carrier having an upper surface and connected to the second support adjacent the second carrier and defining a fourth interior space, wherein the upper surface of the fourth carrier is substantially horizontal and co-planar with the upper surface of the second carrier and moves relative to the second support in the same substantially horizontal plane and is co-planar with the movement of the second carrier; and a fourth plurality of planks connected to the fourth carrier, wherein each plank of the fourth plurality of planks moves relative to the fourth carrier between a first retracted position wherein at least a majority of the plank is positioned in the fourth interior space and a second extended position wherein at least a portion of the plank extends beyond the fourth interior space; and wherein the third carrier and the fourth carrier move in a horizontal direction toward and away from each other to change the size of the opening, and wherein the third plurality of planks and the fourth plurality of planks move in the same horizontal direction to further change the size of the opening.

In some embodiments, the system further comprises a shaft that extends along the first support, wherein the shaft rotates about an axis; a pinion gear connected to the shaft; and a rack connected to the first carrier, wherein the rack is operably engaged with said pinion gear, and wherein rotation of the shaft about the axis in a first direction moves the first carrier toward the opening to change the size of the opening, and rotation of the shaft about the axis in a second direction moves the first carrier away from the opening. In various embodiments, the system further comprises a gearbox positioned at one end of the pinion gear shaft, wherein the gearbox is configured to receive an input shaft associated with a motor, and rotation of the input shaft of the gearbox rotates the output shaft which in turn rotates the pinion gear shaft. In some embodiments, the motor comprises a handheld power tool. In various embodiments, the system further comprises a weldment hold-down having a first bracket connected to the first support and having a second bracket connected to the first carrier, wherein the first support has an end that extends into corresponding recess in the second bracket to limit a vertical tilt of the first carrier relative to the first support.

A further aspect of embodiments of the present disclosure is to provide an adjustable platform system for use in assembly of a launch vehicle, comprising: a first carrier having a first upper surface and defining a first interior space, the first carrier connected to a first fixed support, wherein the first carrier moves relative to the first support; a first plurality of planks connected to the first carrier, wherein each plank of the first plurality of planks moves relative to the first carrier between a first retracted position wherein at least a majority of the plank is positioned in the first interior space and a second extended position wherein at least a portion of the plank extends beyond the first interior space; a second carrier having a second upper surface and defining a second interior space, the second carrier connected to a second rotatable support wherein the second support rotates about an axis of rotation between a first lowered position and a second raised position, wherein when the second support is in the first lowered position the second upper surface of the second carrier is oriented in a substantially horizontal plane and is co-planar with the first upper surface of the first carrier and the second carrier moves relative to the second support in a direction parallel to the axis of rotation for the second support; a second plurality of planks connected to the second carrier, wherein each plank of the second plurality of planks moves relative to the second carrier in a direction parallel to the axis of rotation between a first retracted position wherein at least a majority of the plank is positioned in the second interior space and a second extended position wherein at least a portion of the plank extends beyond the second interior space; and wherein the second support is spaced from the first support to define an opening between the first support and the second support, and wherein when the second support is in the first lowered position access to the opening is blocked by the second support and second carrier and when the second support is in the second raised position access to the opening is not blocked by the second support and second carrier.

In various embodiments, the system further comprises a third carrier connected to the first support and defining a third interior space, wherein the third carrier moves relative to the first support; and a third plurality of planks connected to the first carrier, wherein each plank of the third plurality of planks moves relative to the first carrier between a first retracted position wherein at least a majority of the plank is positioned in the third interior space and a second extended position wherein at least a portion of the plank extends beyond the third interior space.

In some embodiments, the system further comprises a fourth carrier connected to the second support adjacent to the second carrier and defining a fourth interior space, wherein the fourth carrier moves relative to the second support in a direction parallel to the axis of rotation; a fourth plurality of planks connected to the second carrier, wherein each plank of the fourth plurality of planks moves relative to the second carrier in a direction parallel to the axis of rotation between a first retracted position wherein at least a majority of the plank is positioned in the fourth interior space and a second extended position wherein at least a portion of the plank extends beyond the fourth interior space; and an alignment roller extending from the second carrier, the alignment roller having at least one roller configured to contact the fourth carrier such that the alignment roller maintains a spacing between the second and fourth carriers. It will be further appreciated that the present disclosure encompasses embodiments that have five carriers, six carriers, etc.

In various embodiments, the system further comprises a hold-down bracket extending from the second support between the second and fourth carriers, the hold-down bracket has at least a first roller configured to contact an upper surface of a flange extending from the second carrier and at least a second roller configured to contact an upper surface of a flange extending from the fourth carrier to limit movement relative to the second support retain the second and fourth carriers against the second support. In some embodiments, the first fixed support and the second support in the first lowered position extend in a direction that is substantially perpendicular to the direction of movement of the carriers and planks. In various embodiments, the system further comprises a hydraulic system associated with the second support to move the second support between the first and second positions.

Various other features and advantages of the system and methods will become apparent from review of the following detailed description, taken in conjunction with the drawings.

BRIEF DESCRIPTION OF THE DRAWINGS

FIG. 8 is a perspective view of an alignment roller between two carriers according to an embodiment of the platform system;

FIG. 9A is a perspective view of telescoping planks according to an embodiment of the platform system;

FIG. 11B is a further perspective view of an endplate of the endplate system in FIG. 11A according to an embodiment of the platform system; and FIG. 11C is a cross sectional perspective view of a telescoping plank and a captive fastener according to an embodiment of the platform system.

DETAILED DESCRIPTION

Figure 1:
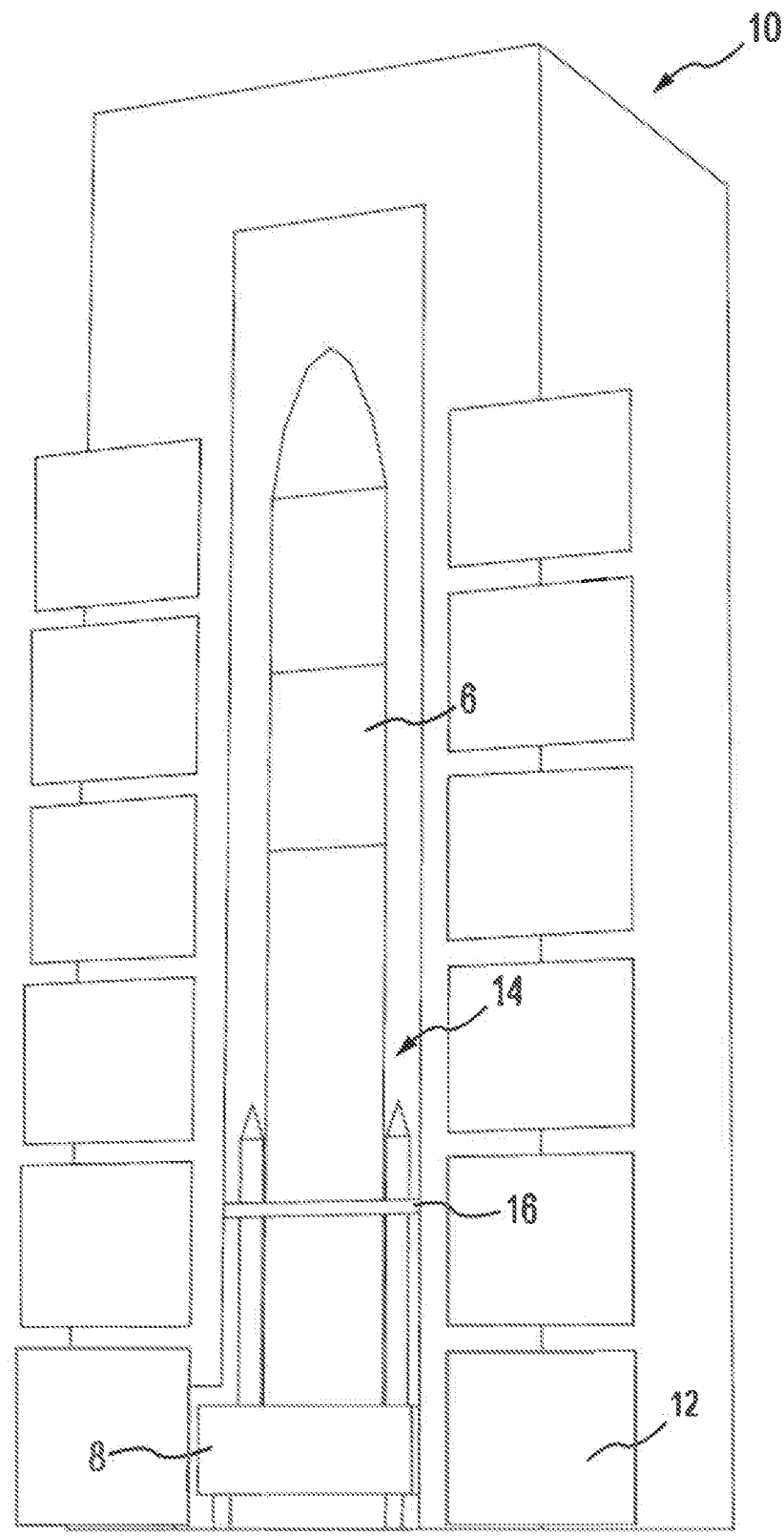
FIG. 1 is a perspective view of one embodiment of a vertical processing facility.

FIG. 1 illustrates a vertical processing facility 10 that receives a launch vehicle 6 and/or components of the launch vehicle 6. A door 12 on one side of the vertical processing facility 10 can move from a first, closed position where the door 12 encloses the interior of the vertical processing facility 10 to a second, open position to provide an opening 14 in the side of the vertical processing facility 10. A launch platform 8 moves components of a launch vehicle 6 through the opening 14 and into the vertical processing facility 10, and then the launch platform 8 removes the complete launch vehicle 6 from the vertical processing facility 10 and transports the launch vehicle 6 to a launch pad. When the launch vehicle 6 and/or components of the launch vehicle 6 are positioned inside of the vertical processing facility 10, a platform system 16 can extend around and partially or fully enclose the launch vehicle 6. Personnel use the platform system 16 to access the launch vehicle 6 and perform various assembly, maintenance, and launch preparation procedures on the launch vehicle 6 within the controlled environment of the vertical processing facility 10. As explained in greater detail below, various aspects of the platform system 16 allow the platform system 16 to quickly and safely change position to accommodate different launch vehicle 6 sizes and configurations.

Figure 2:
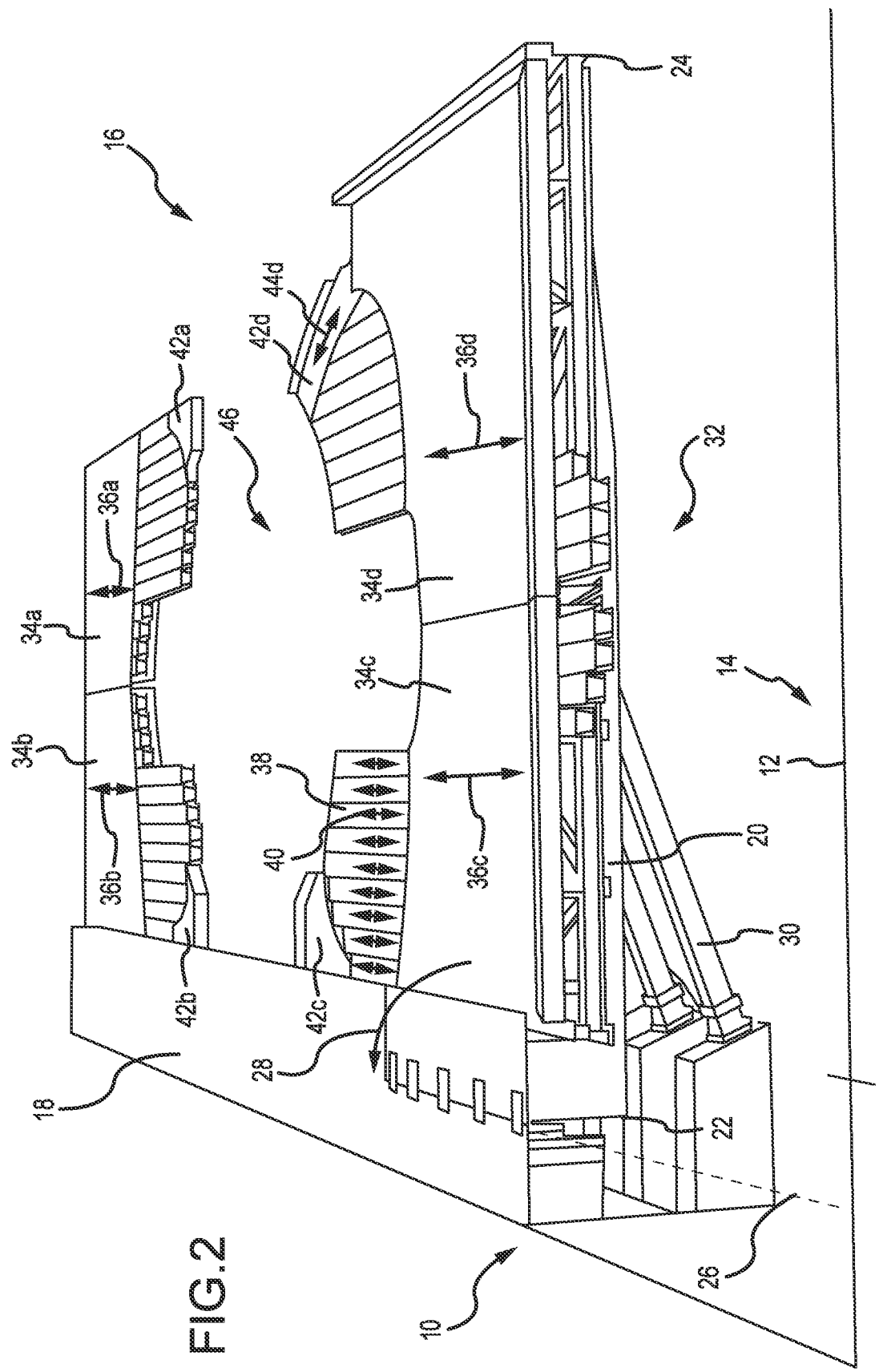
FIG. 2 is a perspective view of supports, carriers, and telescoping planks according to an embodiment of the platform system.

FIG. 2 illustrates a platform system 16 for conforming planks 38 to a launch vehicle in accordance with an exemplary embodiment of the disclosure. The platform system 16 is positioned within a vertical processing facility 10 that has a door 12 on one sidewall that selectively covers an opening 14 in the vertical processing facility 10. A launch vehicle and/or components of a launch vehicle can enter the vertical processing facility 10 through the opening 14 and move toward the platform system 16 for assembly. A fixed portion 18 of the platform is secured to the vertical processing facility 10 and can define one side of the platform system 16. It will be appreciated that this portion 18 can move vertically in some embodiments to change the height of the platform system 16 within the vertical processing facility 10.

A support 20 extends from the fixed portion 18 from a first end 22 to a second end 24, and the support 20 rotates about an axis 26 relative to the fixed portion 18. The support 20 can rotate from a generally horizontal position as shown in FIG. 2 to a generally vertical position in a first direction 28 and stop at any position in between. When the support 20 is raised, a pathway 32 is created in the platform system 16 and allows a launch vehicle and/or components of a launch vehicle to move laterally or horizontally through the pathway 32 and into an opening 46 of the platform system 16. Once the launch vehicle or components are positioned within the platform system 16, the support 20 can be lowered from a raised position to the horizontal position so that the platform system 16 generally encloses the launch vehicle. As shown in FIG. 2 and as described in further detail below, a pair of hydraulic cylinders 30 extend from the vertical processing facility 10 at a location below the support 20 to raise and lower the support 20.

As noted, the ability to raise a platform facilitates movement of the launch vehicle or components into an out of the vertical processing facility 10. Once assembly has started, components are typically moved into position by overhead crane, which vertically lowers the components into a central opening 46 defined by supports 20, carriers 34a, 34b, 34c, 34d, and/or planks 38. During this phase, the rotatable support 20 typically stays in the horizontal or deployed position. However, when assembly is completed, the support 20 is raised to allow the fully assembled vehicle to exit the vertical processing facility 10 and move to the launch pad.

With the launch vehicle positioned within the platform system 20, a plurality of carriers 34a, 34b, 34c, 34d can move to position planks 38 closer to the outer surface of the launch vehicle. In this embodiment, the third carrier 34c and the fourth carrier 34d move relative to the support 20 in respective directions 36c, 36d that are substantially parallel to the axis 26 about which the support 20 rotates relative to the fixed portion 18. Similarly, the planks 38 also move relative to the respective carriers in a direction 40 that is substantially parallel to the axis 26 about which the support 20 rotates relative to the fixed portion 18. The term "substantially" in this respect can mean a +/−10% difference on a relative basis. The parallel arrangement between the movement of the carriers 34c, 34d and the axis 26 best utilizes the space around the launch vehicle in view of the rotation of the support 20 relative to the fixed portion 18. However, it will be appreciated that embodiments of the present disclosure encompass other relative orientations between the movement of the carriers 34c, 34d and the axis 26.

Two carriers 34c, 34d are positioned on the support 20 to better conform to the outer surface of the launch vehicle. A single carrier positioned on the support 20 could only move as close to the launch vehicle as the outermost dimension or portion of the launch vehicle. However, the planks 38 might not be able to safely extend far enough to reach other portions of the launch vehicle. Two carriers 34c, 34d can better conform to the outer surface of the launch vehicle. For example, one carrier can extend to the aforementioned outermost dimension or portion of the launch vehicle, and the other carrier can extend closer to the launch vehicle. As a result, the planks 38 in the other carrier more safely conform to the outer surface of the launch vehicle without overextending beyond the carrier and cantilevering too far. Moreover, having more than two carriers 34c, 34d positioned on the support 20 can result in too much complexity and a greater likelihood of failure. Thus, two carriers 34c, 34d represent an optimum in view of the above considerations. However, it will be appreciated that embodiments of the present disclosure encompass a greater or fewer number of carriers positioned on the support 20 than two.

Also shown in FIG. 2 are a first carrier 34a and a second carrier 34b that are positioned on a support that does not rotate relative to the fixed portion 18 of the platform system 16. The vertical processing facility 10 can have a single door 12 for an opening 14 through which to receive the launch vehicle and/or components of the launch vehicle. Therefore, the platform system 16 typically only needs a single movable support 20 located near the door or opening 14 to accommodate the launch vehicle and/or components of a launch vehicle. However, it will be appreciated that embodiments of the present disclosure encompass a first carrier 34a and a second carrier 34b that are positioned on a moveable support. The first carrier 34a and the second carrier 34b are also configured as two carriers that move in respective directions 36a, 36b substantially parallel to the axis 26 like the other carriers 34c, 34d. Once the carriers 34a, 34b, 34c, 34d are positioned relative to the outer surface of the launch vehicle, then the planks 38 can be moved into position to better conform the platform system 16 to the launch vehicle. Moreover, any additional inserts 42a, 42b, 42c, 42d, both fixed and movable in at least one direction 44d, can be positioned to finalize the platform system 16 around the launch vehicle. Though the supports, carriers, planks and other components are described in terms of "first", "second", etc., it will be appreciated that the numbering is a matter of convenience. The supports, carriers, planks, and other components can be described in a different order or manner while being encompassed by the present disclosure.

Figure 3:
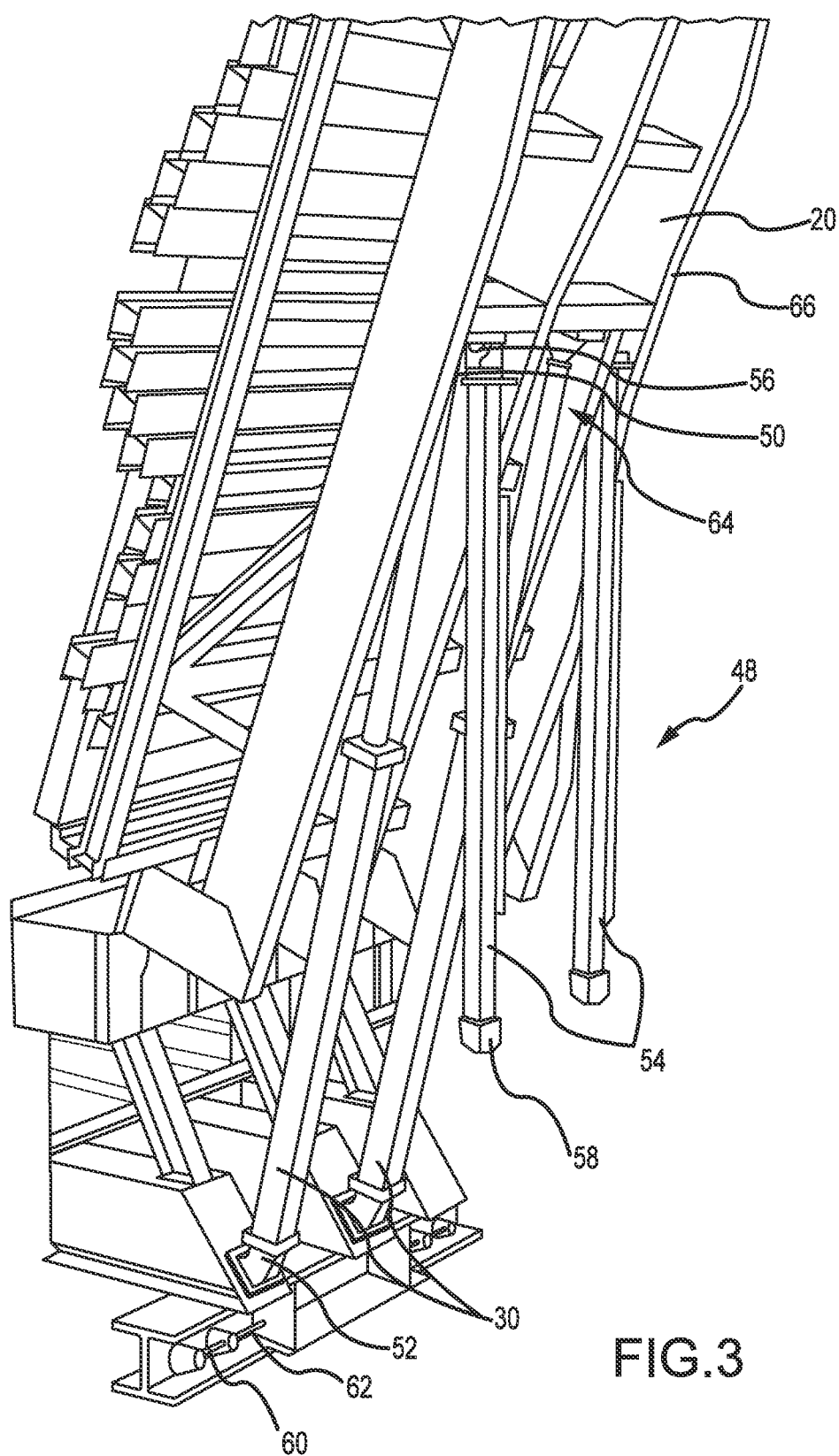
FIG. 3 is a perspective view of a lift system for a support, a carrier, and telescoping planks according to an embodiment of the platform system.

FIG. 3 illustrates a lift system 48 for a support 20 of a platform system in accordance with an exemplary embodiment of the disclosure. The lift system 48 raises and lowers the support 20 between a generally horizontal position and vertical position. As noted above, a pair of hydraulic cylinders 30 extend from a lower end 52 that is rotatably connected to the vertical processing facility at a location below the support 20 to an upper end 50 that is rotatably connected to the support 20. Thus, as the hydraulic cylinders 30 extend and retract, the support 20 rotates about the axis 26 in FIG. 2.

A pair of links 54 extend between a free end 58 and an upper end 56 that is rotatable connected to the support 20. The free ends 58 of the links 54 can selectively connect to a pin 62 at a location that is below the rotatable connection between the lower end 52 of the hydraulic cylinders 30 and the vertical processing facility. A pneumatic cylinder 60 can press a pin 62 into a free end 58 of a link 54 to secure the link 54 in place, and both links 54 hold the support 20 in the horizontal position. The pneumatic cylinder 60 releases the pin 62 from the free end 58 of the link 54, and the hydraulic cylinders 30 can raise the support 20 into the vertical position. Once in the vertical position, the hydraulic cylinders 30 and the links 54 are positioned in a recess 64 within the support 20 such that the cylinders 30 and the links 54 do not extend past a lowermost edge or surface 66 of the support 20. This maximizes the pathway in the platform system to receive a launch vehicle and/or launch vehicle components.

Figure 4:
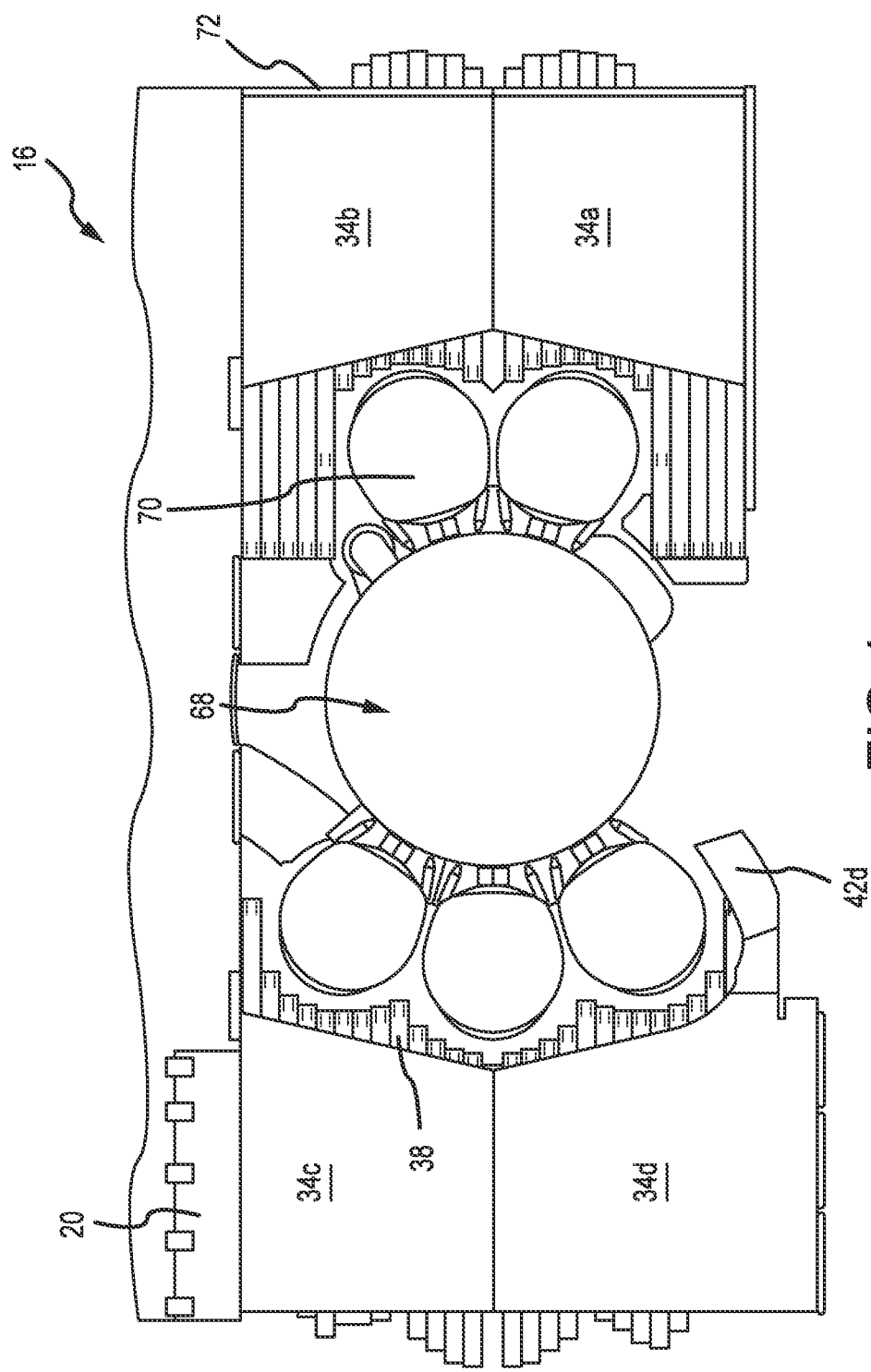
FIG. 4 is a top plan view of a platform system conforming to a first launch vehicle with five boosters according to an embodiment of the platform system.
Figure 5:
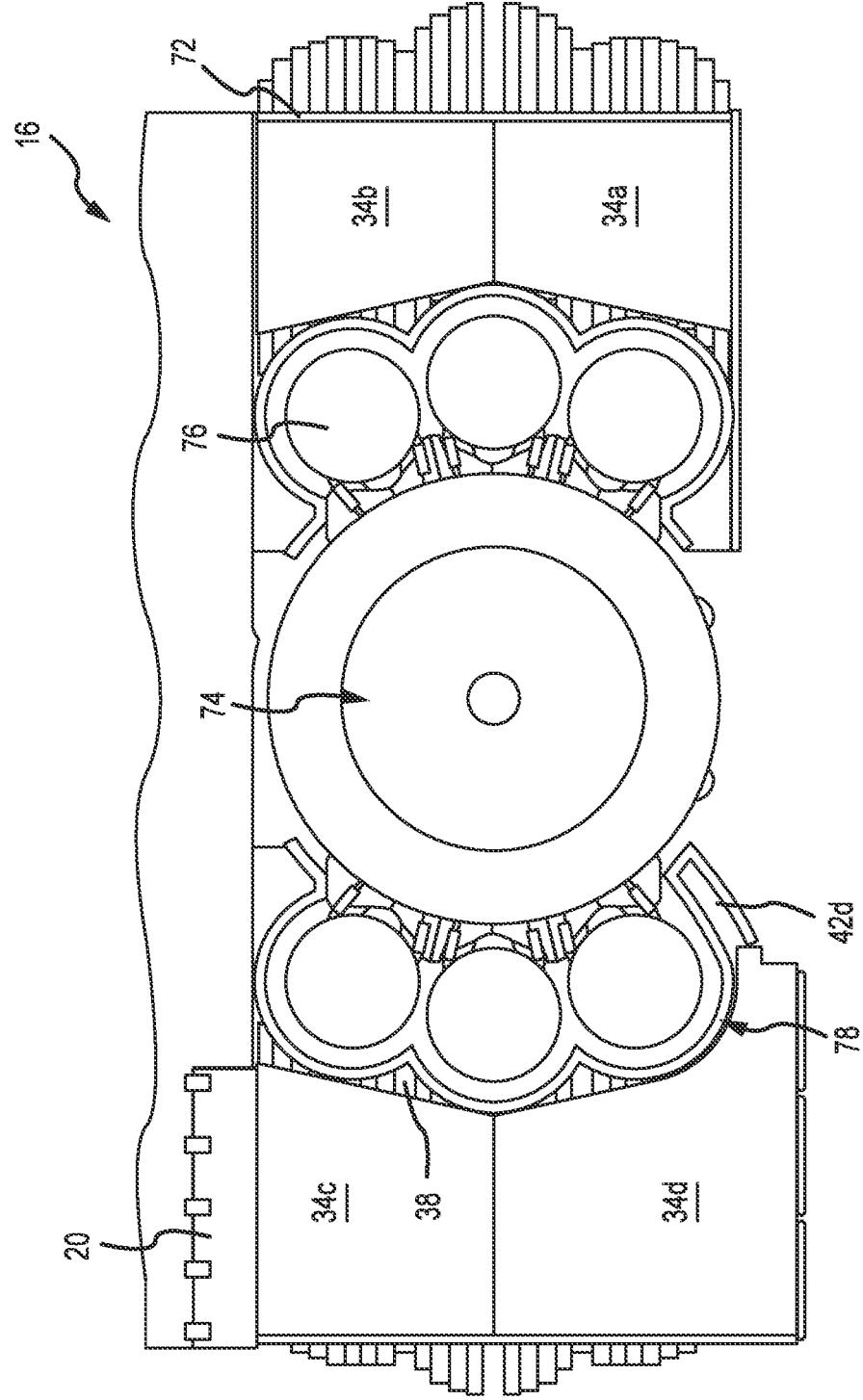
FIG. 5 is a top plan view of a platform system conforming to a second launch vehicle with six boosters according to an embodiment of the platform system.

FIGS. 4 and 5 illustrate a platform system 16 positioned about and conforming to different launch vehicles. In FIG. 4, a first launch vehicle 68 has a first size and an arrangement of five boosters 70. The support 20, the carriers 34a, 34b, 34c, 34d, and the planks 38 are positioned around the outer surface of the first launch vehicle 68 and the boosters 70 such that personnel can access and work on the first launch vehicle 68 and boosters 70. Also shown in FIG. 4 is an additional support 72 that, in this embodiment, is fixed and non-rotatable. The first and second carriers 34a, 34b can move relative to the additional support 72 as described elsewhere herein. An additional insert 42d can supplement the substantially continuous surface formed by the carriers 34a, 34b, 34c, 34d and planks 38. FIG. 5 shows the platform system 16 conformed to a second launch vehicle 74 that has an arrangement of six boosters 76. The supports 20, 72, the carriers 34a, 34b, 34c, 34d, and the planks 38 quickly conform to the larger launch vehicle 74 and boosters 76 to improve turnaround time between launches. As described in further detail below, an endplate system 78 can conform the planks 38 to the launch vehicle 74 and prevent debris from falling off of the platform 16.

Figure 6A:
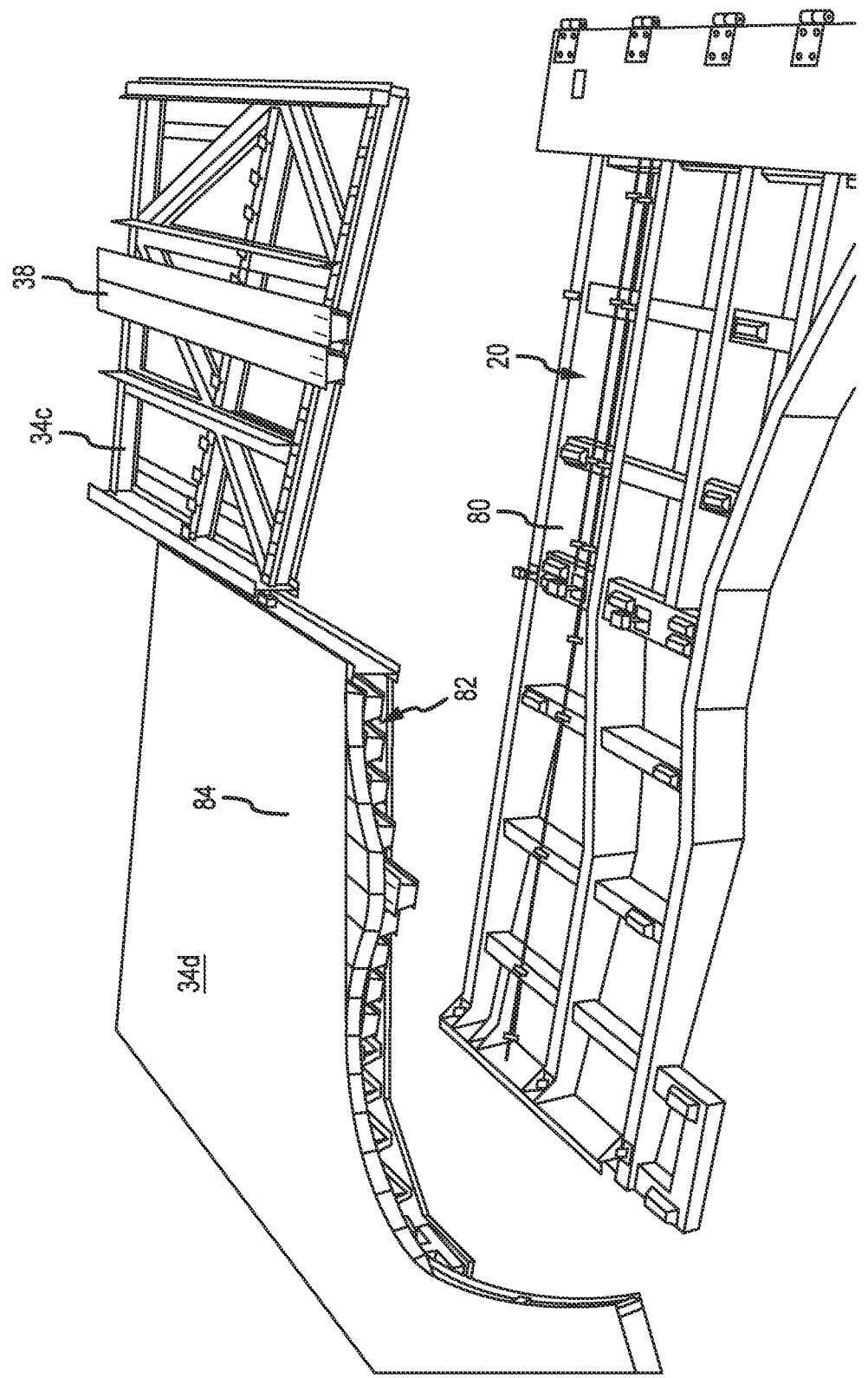
FIG. 6A is a perspective view of a support, two carriers, and telescoping planks according to an embodiment of the platform system.
Figure 6B:
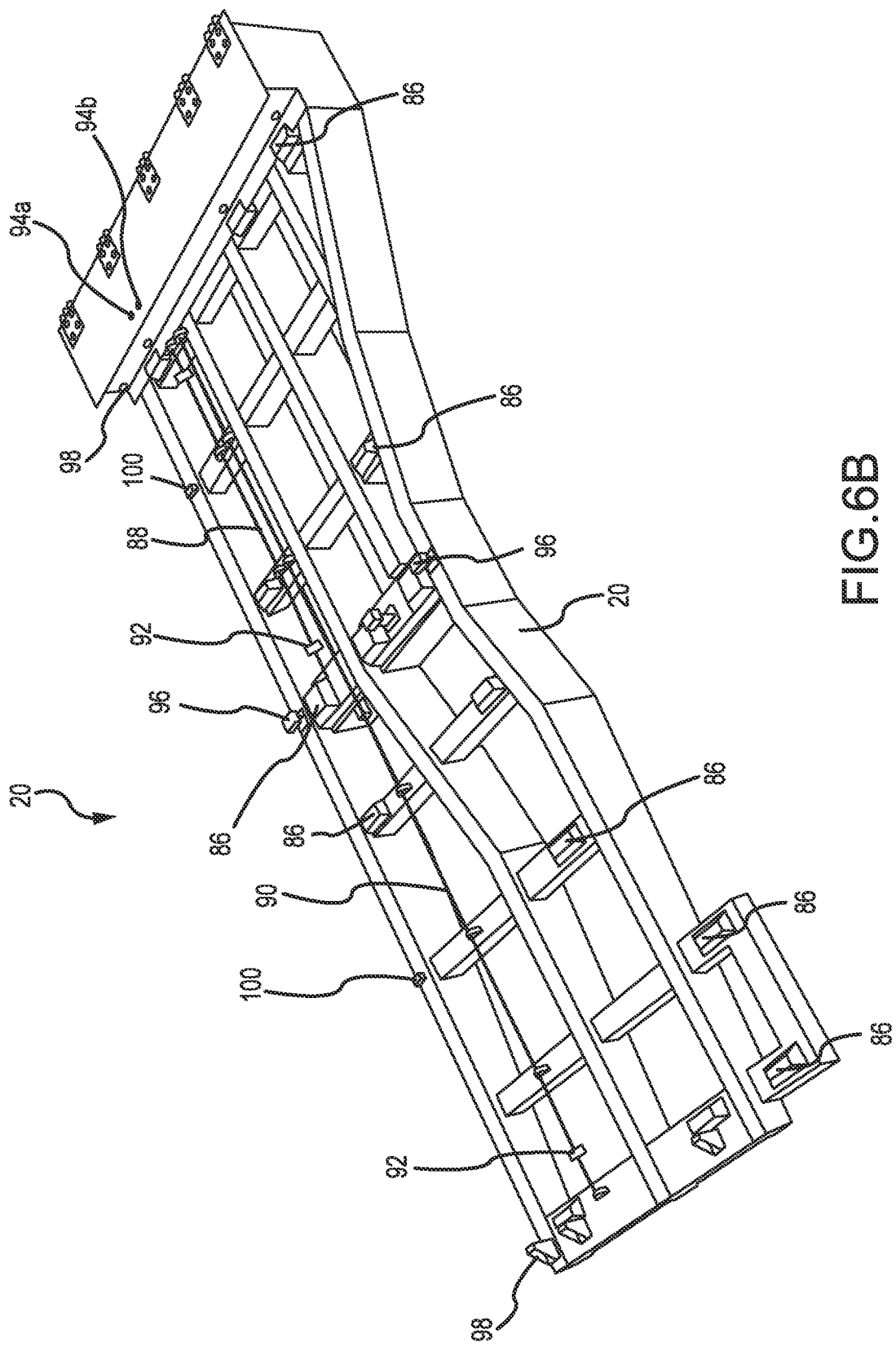
FIG. 6B is a perspective view of a support according to an embodiment of the platform system.

FIG. 6A illustrates a support 20, carriers 34c, 34d, and planks 38 in an exploded view, and FIG. 6B illustrates only the support 20 in a perspective view. The support 20 has a frame 80, and as described above, the carriers 34c, 34d move relative to the support 20. The planks 38 move relative to the carriers 34c, 34d to conform to a launch vehicle. Each carrier has an interior space 82 to receive the planks 38. Each plank 38 can move with respect to the respective carrier 34 between multiple positions, including a retracted position and an extended position. In the retracted position, the entirety or at least a majority of the plank 38 is positioned within the interior space 82, and in the extended position, at least a portion of the plank 38 is positioned outside of the interior space 82. It will be appreciated that in some embodiments, a plank may not be fully positionable within the interior space. Thus, the different positions of the planks relative to the carrier can be expressed in a variety of ways. For instance, in a first position, a distal end of a plank facing the launch vehicle is a first distance from an edge of the carrier facing the launch vehicle. In a second position, the distal end of the first plank is a second distance from the edge of the carrier where the second distance is greater than the first distance such that the plank is closer to the launch vehicle. Finally, each carrier has a planar upper surface 84 that is generally co-planar with the other upper surfaces of the other carriers. The carriers can be described as moving within this plane when the rotatable support is in a lowered position.

A first shaft 88 moves the third carrier in the direction 36*c* shown in FIG. 2, and a second shaft 90 moves the fourth carrier in the direction 36*d* shown in FIG. 2. Specifically, pinions 92 of the shafts 88, 90 engage racks on undersides of the third and fourth carriers to move the third carrier and fourth carrier closer to or farther from the launch vehicle. Personnel can engage a first shaft gearbox 94*a* with a drill or crank to rotate the first shaft 88 and engage a second shaft gearbox 94*b* with a drill or crank to rotate the second shaft 90. Alternatively, the output of a motor can be operably connected to the shafts 88, 90 or gearboxes 94*a*, 94*b* to rotate the shafts 88, 90. Rollers 86 bear the weight of the carriers on the support 20, and a hold-down bracket 96, cam followers 98, and a weldment hold-down bracket 100 retain the carriers on the support 20.

Figure 7:
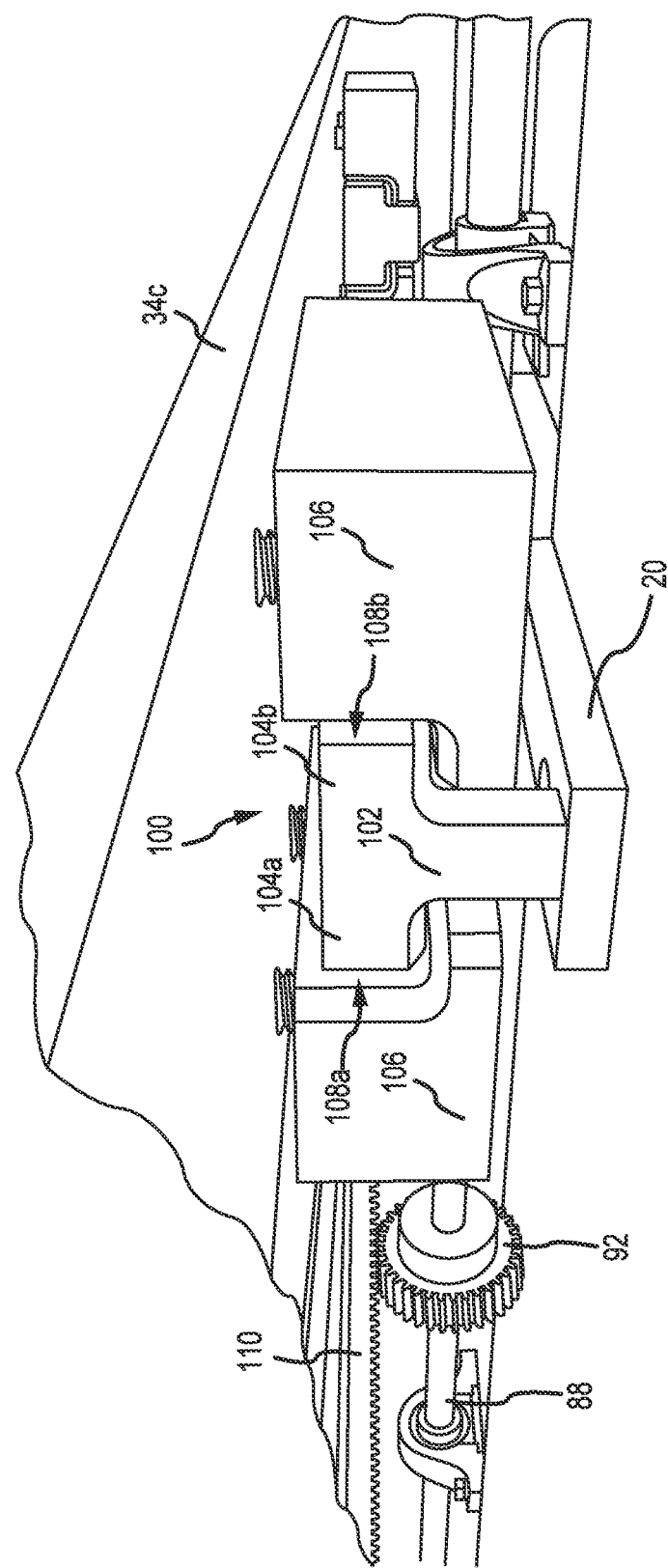
FIG. 7 is a perspective view of a drive system between a support and a carrier according to an embodiment of the platform system.

FIG. 7 illustrates the space between the support 20 and the third carrier 34*c* of a platform system in accordance with an exemplary embodiment of the disclosure. As shown, the pinion 92 of the first shaft 88 engages a rack 110 on the underside of the third carrier 34*c*. Thus, as the shaft 90 and pinion 92 rotate about an axis, the rack 110 moves the carrier 34*c* toward or away from the launch vehicle. In addition, according to one embodiment, a weldment hold-down bracket 100 secures the third carrier 34*c* to the support 20. The weldment hold-down bracket 100 generally comprises a first T-shaped bracket 102 connected to the support 20 and a second pair of brackets 106 connected to the carrier 34*c*. The first bracket 102 has two ends 104*a*, 104*b* configured to be received in corresponding recesses 108*a*, 108*b* in the second brackets 106. In an initial state, the first bracket 102 does not contact the second brackets 106 and therefore does not impede movement of the carrier 34*c* relative to the support 20. However, the brackets 102, 106 contact each other during cantilevered loading of the carrier 34*c* to hold the carrier 34*c* to the support 20 and prevent a vertical tilt of the carrier 34*c* relative to the support 20. While a rack and pinion system is depicted for moving the carriers relative to the support 20, it will be appreciated that other systems can move the carriers such as a linear actuator, a pneumatic system, or a hydraulic system.

FIG. 8 illustrates a front perspective view of a support 20, a third carrier 34*c*, a fourth carrier 34*d*, and planks 38 of a platform system in accordance with an exemplary embodiment of the disclosure. Specifically, FIG. 8 shows the space between the third carrier 34*c* and the fourth carrier 34*d*. A hold-down bracket 96 has a body 116 that extends upward from the support 20, and rollers 118*a*, 118*b* are positioned at a distal end of the body 116 that allow the carriers 34*c*, 34*d* to move relative to the support 20. The inner side of each carrier 34*c*, 34*d* has an end portion 112*a*, 112*b* with a flange 114*a*, 114*b* that extends outward, and the rollers 118*a*, 118*b* engage the upper surface of each flange 114*a*, 114*b*. In addition, the planks 38 can be arranged to have a flange, which is described in detail below, oriented toward the end portions 112*a*, 112*b* to help guide the planks 38 and provide a substantially continuous surface.

Next, an alignment roller 120 has a body 122 that extends from the end portion 112*b* of the third carrier 34*c*. At least one roller 124 is positioned at a distal end of the body 122 of the alignment roller 120 to allow the third carrier 34*c* and the fourth carrier 34*d* to move relative to each other. Moreover, when the support 20 moves from the horizontal position to the vertical position, the alignment roller 120 maintains the spacing between the third carrier 34*c* and the fourth carrier 34*d*.

Figure 9B:
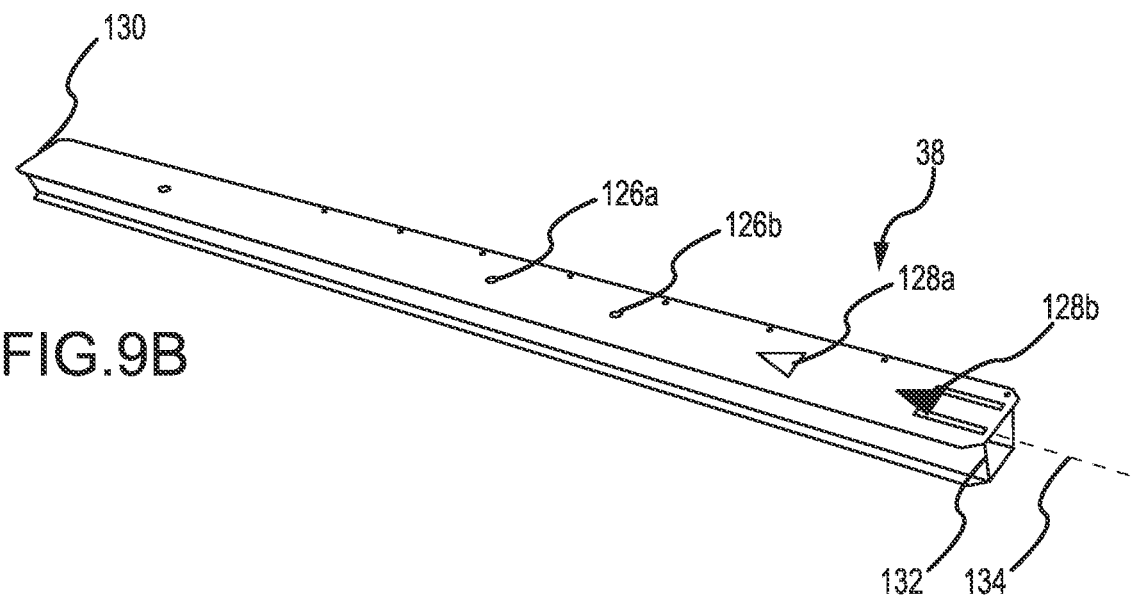
FIG. 9B is a perspective view of the telescoping plank in FIG. 9A according to an embodiment of the platform system.
Figure 9C:
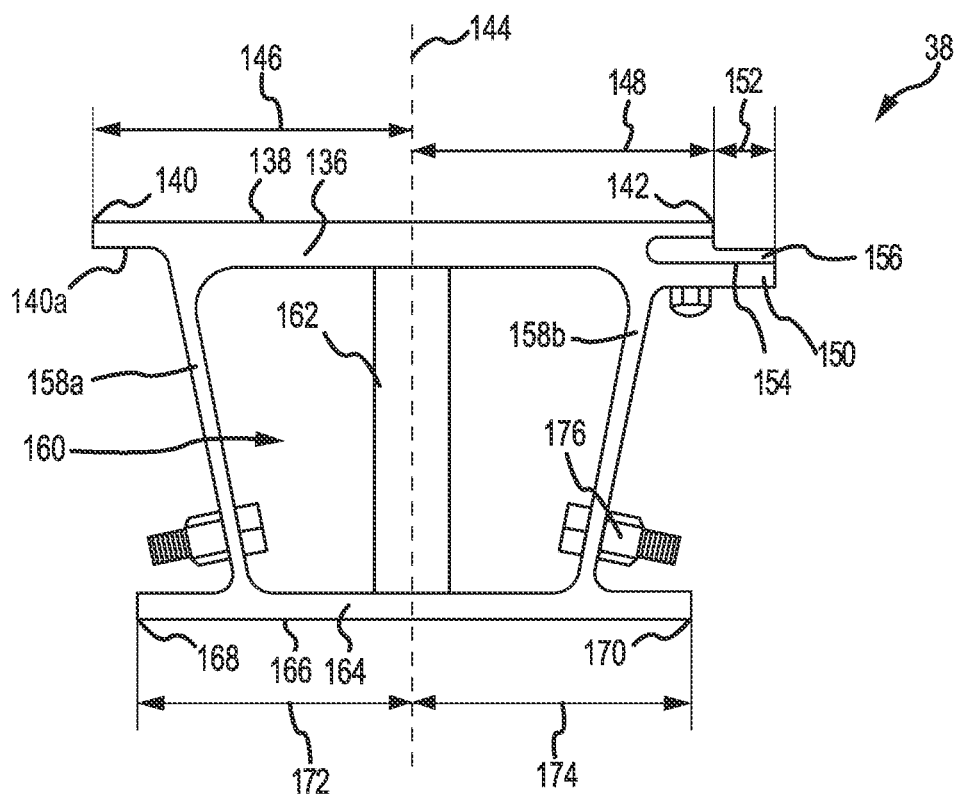
FIG. 9C is an elevation view of the telescoping plank in FIG. 9A according to an embodiment of the platform system.

FIGS. 9A-9C illustrate various views of the planks 38. FIG. 9A is a perspective view of the planks 38 on the third carrier 34*c*, FIG. 9B shows a perspective view of an individual plank 38, and FIG. 9C is a front elevation view of a plank 38. The planks 38 can be moved to different positions along the carrier 34*c*, and a given plank 38 can have at least one mark 128*a*, 128*b*, and preferably multiple marks 128*a*, 128*b*, to indicate where a given plank 38 should be moved relative to the carrier 34*c* for a specific launch vehicle. For example, personnel can align a first mark 128*a* with an inner edge of the carrier 34*c* to conform the plank 38 to the outer surface of a first launch vehicle. Then, personnel can insert a pin through a first aperture 126*a* of the plank 38 to secure the position of the plank 38 relative to the carrier 34*c*. Next, personnel can move the plank 38 such that a second mark 128*b* at a different location on the upper surface of the plank 38 aligns with the inner edge of the carrier 34*c*. Now, the plank 38 conforms to the outer surface of a second launch vehicle with a different size. Personnel can insert a pin through a second aperture 126*b* of the plank 38 to secure the position of the plank 38 relative to the carrier 34*c*. It will be appreciated that the marks 128*a*, 128*b* can be combined on a given plank 38 as shown in the four leftmost planks 38. The combined marks 128*a*, 128*b* signify that the plank 38 should be in the same position for both launch vehicles. It will be appreciated that a mark can include, but is not limited to, a physical protrusion or depression in the upper surface of the plank 38, a secondary color on the upper surface, etc. Moreover, for example, a protrusion can indicate a first launch vehicle and a depression can indicate a second launch vehicle in some embodiments. Similarly, a first color can indicate a first launch vehicle and a second color can indicate a second launch vehicle.

FIG. 9B shows the plank 38 extending between a first end 130 to a second end 132 to define a longitudinal axis 134, and FIG. 9C shows a plank 38 generally comprising a top plate 136, a bottom plate 164, and sidewalls 158*a*, 158*b* that extend therebetween to define an opening 160 that extends through the plank 38 along the longitudinal axis 134. The top plate 136 has an upper surface 138 that extends between a first edge 140 and a second edge 142. The edges 140, 142 extend from a centerline 144 of the plank 38 by a first distance 146 and a second distance 148, respectively. A flange 150 extends outward from below the second edge 142, and the flange 150 extends beyond the second edge 142 by a flange distance 152. In this embodiment, a friction-reducing material 156 is positioned on an upper surface 154 of the flange 150. When a plurality of planks 38 are arranged within a carrier, the lower surface 140*a* of first edge 140 of one plank 38 contacts the friction-reducing material 156 of the flange 150 of an adjacent plank 38. Thus, the planks 38 can be manually moved between positions. In addition, the planks 38 overlap by a distance that is approximately equal to the flange distance 152 to form a substantially continuous surface for the platform surface from adjacent upper surfaces 138 of adjacent planks 38. "Substantially" in this respect means a surface that provides stable footing for personnel and does not allow debris or materials to pass between adjacent planks 38. Therefore, the upper surfaces 138 of the top plates 136 and flanges 150 provide a substantially continuous surface, even with small gaps between top plates 136 of adjacent planks 38. In alternative embodiments, it will be appreciated that a lower surface below the first edge 140 of the top plate 136 may have a friction-reducing material that contacts the upper surface 154 of the flange 150, or the planks 38 may not comprise any friction-reducing material to establish the substantially continuous surface.

Next, the bottom plate 164 has a lower surface 166 that extends between a third edge 168 and a fourth edge 170. The third edge 168 extends from the centerline 144 by a third distance 172, and the fourth edge 170 extends from the centerline 144 by a fourth distance 174. Generally, the third distance 172 is less than the first distance 146, and the fourth distance 174 is less than the second distance 148 or at least less than a combination of the second distance 148 and the flange distance 152. Thus, a third edge 168 of one plank 38 does not overlap the fourth edge 170 of an adjacent plank 38 to allow plank holders to secure planks 38 to the carriers. Also shown in FIG. 9C is an end stop 176 that can limit the linear movement of the plank 38 relative to the carrier to prevent overextension of the plank. Further still, a stop tube 162 is shown in FIG. 9C that extends through an aperture in each plank 38 and into, for example, a recess or aperture in the carrier to secure the planks 38 relative to the carriers.

Figure 10A:
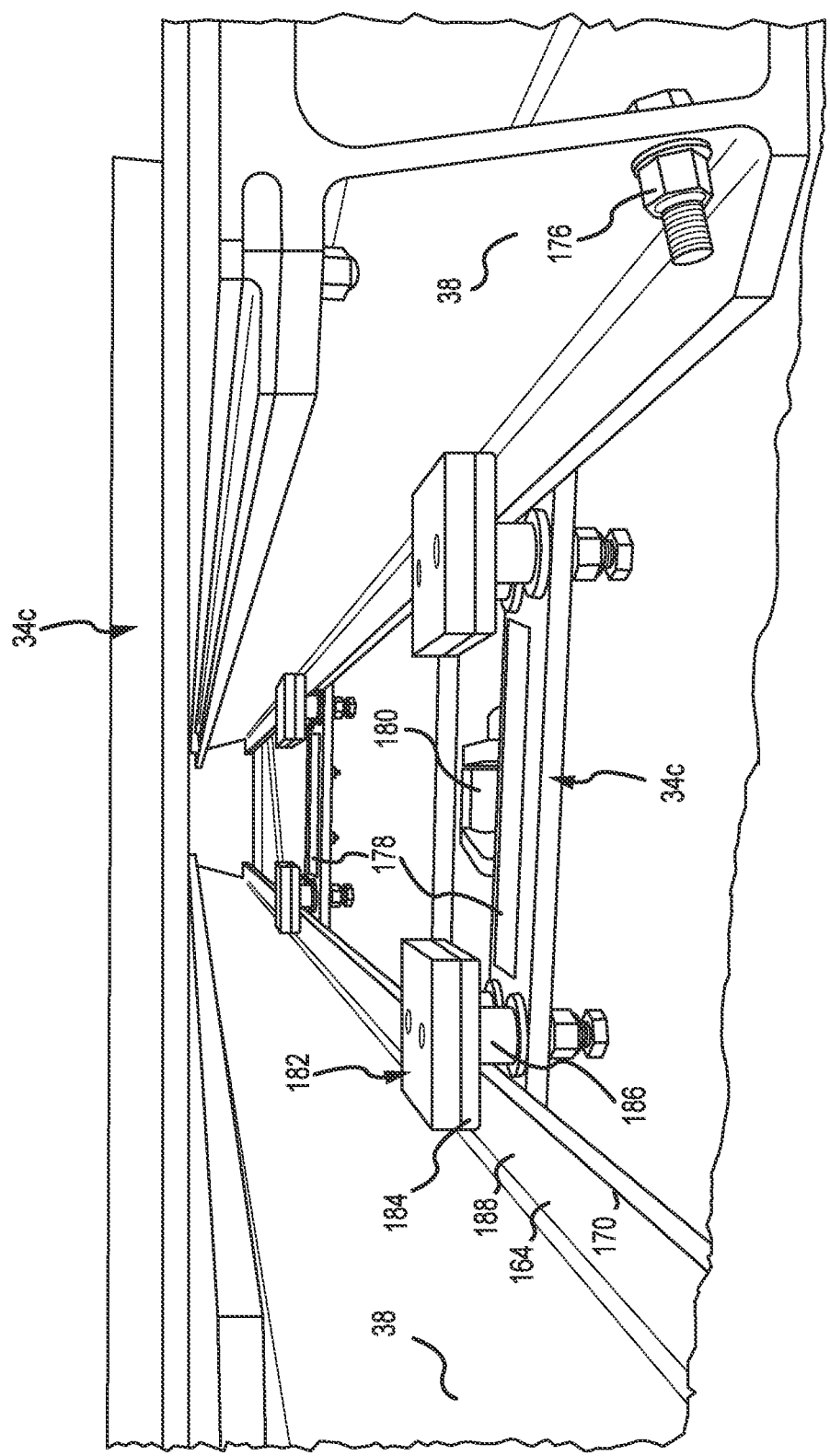
FIG. 10A is a perspective view of telescoping planks and a plank holder according to an embodiment of the platform system.

FIG. 10A illustrates a perspective view of the planks 38 and the components that secure the planks 38 to a carrier 34c. To begin, a single plank 38 is not depicted in FIG. 10A to more clearly show the various components in the figure. At least two plank holders 182 are positioned between adjacent planks 38 to secure the planks 38 to the carrier 34c. Each plank holder 182 can comprise a friction-reducing material 184 on an underside of the plank holder 182 that contacts the upper surface 188 of a bottom plate 164 of a plank 38. The friction-reducing material 184 can be any material that reduces the friction coefficient between the plank holder 182 and the bottom plate 164 of the plank 38. In addition, a spacer 186 extends between the carrier 34c and the friction-reducing material 184 of the plank holder 182. The spacer 186 is fixed against rotation, and the spacer 186 can maintain the lateral spacing between adjacent planks 38. The spacer 186 can contact the second end 170 of the bottom plate 164 of a plank 38 to maintain the spacing, in particular, when the carrier 34c is tilted from a horizontal position to a vertical position. It will be appreciated that the spacer 186 can move rotate freely in some embodiments to reduce the coefficient of friction when in contact with planks 38 within the carrier 34c to provide more/less control when positioning planks 38 in proximity to the launch vehicle.

Next, two glide pads 178 made from friction-reducing material and a roller 180 are positioned between the carrier 34c and a plank 38. The glide pads 178 can be made from any material that reduces the static and/or dynamic friction coefficient between the carrier 34c and the planks 38. The glide pads 178 are positioned proximate to the plank holders 182 so that the planks 38 are held in place by the plank holders 182, but not so tightly that the planks 38 cannot be manually moved. To help promote the movement of the planks 38 in a linear direction relative to the carrier 34c, a roller 180 bears part of the weight of a given plank 38. The roller 180 rotates as personnel move a plank 38 from one position relative to the carrier 34c to another position. In some embodiments, glide pads 178 alone may still produce too much friction for the planks 38 to be manually moved, and thus, the roller 180 is necessary to preserve the manually movable nature of the planks 38. In various embodiments, the roller 180 is positioned between two glide pads 178 and two sets of plank holders 182 so that any forces imparted on the plank 38 from the plank holders 182 is balanced on the roller 180. The roller 180 bears the total forward weight of the plank 38 during various positioning in relation to the launch vehicle. Once load is applied from personnel or equipment, due to deflection and minimal space between the forward glide pad 178 and the plank 38, the load is then shared between the forward glide pad 178 the roller 180.

Also shown in FIG. 10A is an end stop 176 that prevents a plank 38 from extending too far relative to a carrier 34c and a plank holder 182 such that a plank 38 falls out of the carrier 34c. Moreover, a plank 38 can extend too far and unintentionally contact an outer surface of a launch vehicle. With a plurality of launch vehicle sizes, a plank 38 would not need to extend farther than necessary to meet the outer surface of the smallest launch vehicle. In view of these issues, one or more end stops 176 can be strategically placed on the plank 38 to contact one or more plank holders 182 and limit the linear movement of a plank 38 in one or both directions.

Figure 10B:
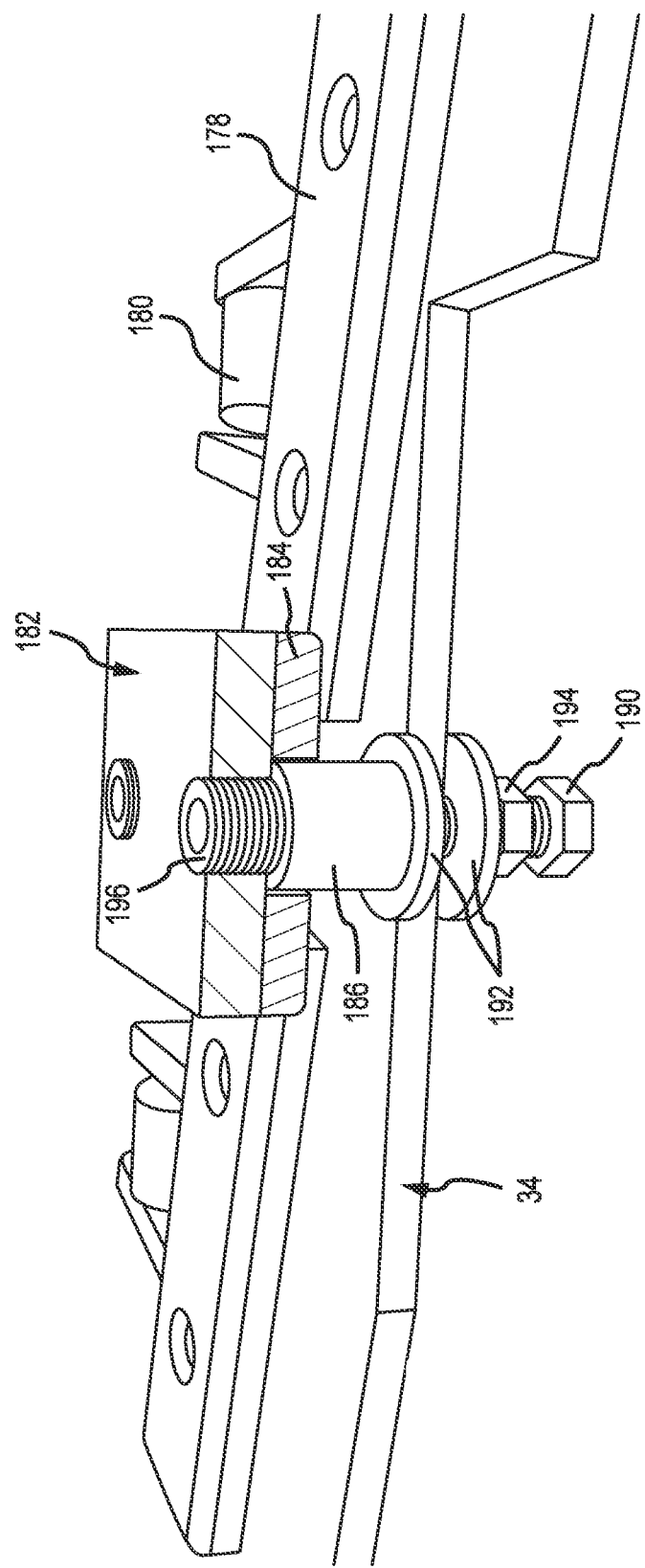
FIG. 10B is a partial cross sectional view of a plank holder according to an embodiment of the platform system.

FIG. 10B illustrates a partial cross sectional view of a plank holder 182. As described above, the plank holder 182 has a friction-reducing material 184 on a lower surface. A bolt 190 is bonded to a threaded insert 196 preventing independent rotation that connects the pad 182 to the carrier 34c, and the bolt 190 extends through the spacer 186 described above. The bolt 190 extends through part of the carrier 34c, and two washers 192 brace the plank holder 182 against moment forces, for instance, when the support and carriers are moved from a horizontal position to a vertical position. A lock nut 194, and a threaded insert 196 finally secure the plank holder 182 to the carrier 34c. The lock nut 194 prevents an unintended removal of the plank holder 182 from the carrier 34c, and the bolt 190 can be adjusted to move the friction-reducing material 184 closer to the carrier 34c, and thus, the bottom plate of the plank. If the material 184 contacts a plank and/or contacts a plank with an increased force, then more effort is required to manually move the plank between positions. In this sense, the bolt 190 with the bonded threaded insert 196 can tune or change the amount of friction force a plank experiences relative to the plank holder 182 and other components such as the glide pads and roller.

Figure 11A:
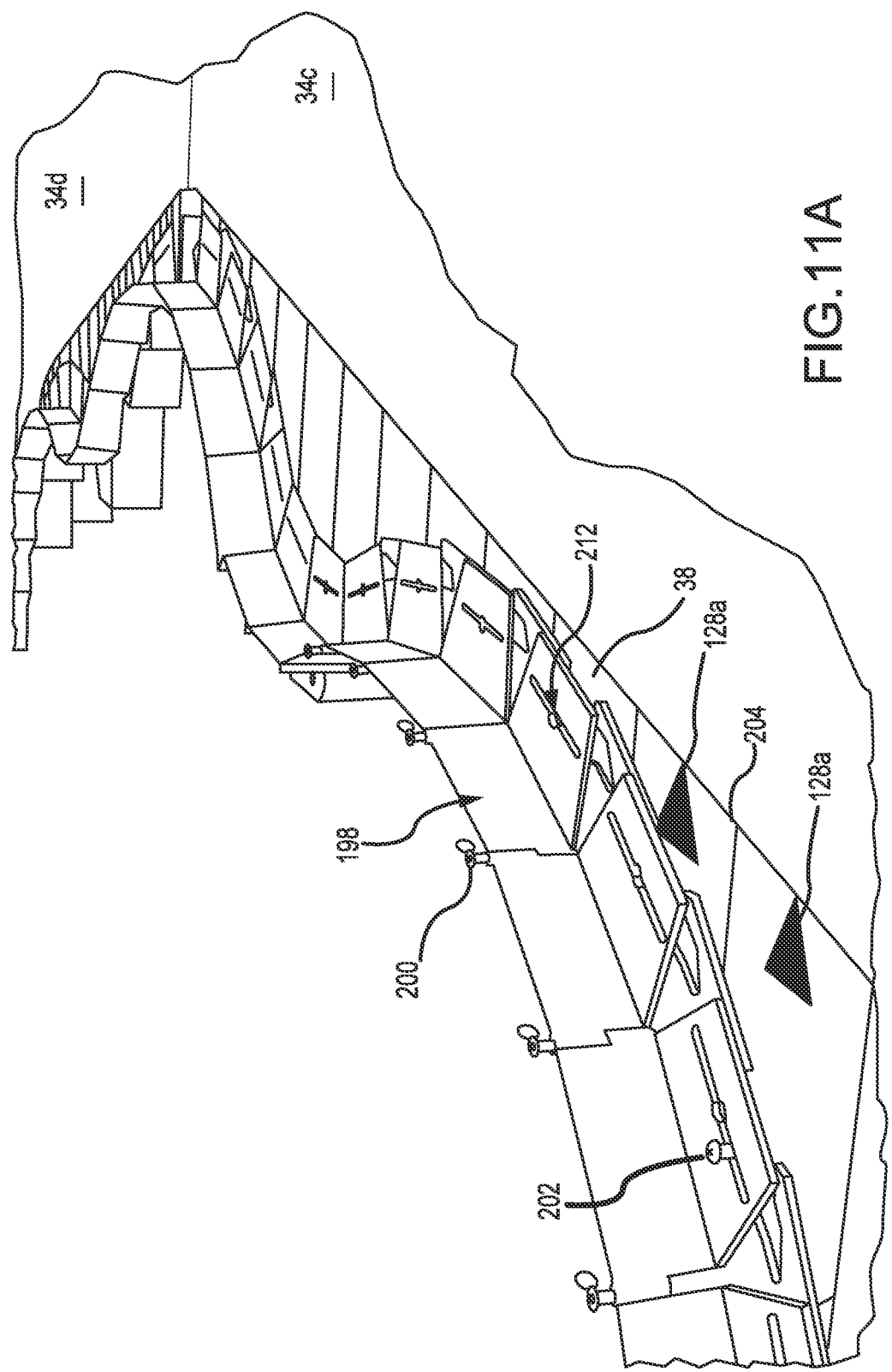
FIG. 11A is a perspective view of an endplate system according to an embodiment of the platform system.

FIG. 11A illustrates a series of endplates 198 arranged at the distal ends of the planks 38. The endplates 198 can be quickly positioned to conform the platform system to the outer surface of the launch vehicle. The endplates 198 also prevent loose components such as tools, bolts, etc. from falling off of the platform and onto the launch vehicle. The platform system can be elevated above the ground so a falling tool or bolt can significantly damage a bottom portion of the launch vehicle or injure personnel. First, the planks 38 are arranged in the predetermined positions relative to the carriers 34c, 34d shown by the first mark 128a on the plank 38 being aligned with an edge 204 of the third carrier 34c. Once the planks 38 are secured relative to the carriers 34c, 34d, the endplates 198 can be attached to the distal ends of the planks 38. A captive bolt 202 is raised from a plank 38 and inserted through a slot 212 of an endplate 198 to secure the endplate 198 to the plank 38. Adjacent endplates 198 are joined by a pin 200.

FIG. 11B illustrates two endplates 198 joined together. Each endplate 198 has a vertical portion 206 and a horizontal portion 210, and a hinge 208 extends from either side of the vertical portion 206. A pin 200 extends through the hinge 208 of one endplate 198a and the hinge 208 of an adjacent endplate 198b. The hinges 208 and pin 200 allow adjacent endplates 198 to rotate relative to each other and conform to a generally round outer shape of a launch vehicle.

Next, the horizontal portion 210 has a slot 212 that receives a captive bolt, specifically, a first section 214 of the slot 212 has a width large enough to receive the head of the bolt. The remaining second sections 216 of the slot 212 have smaller width that is larger than a body of the bolt but not the head of the bolt. Thus, the captive bolt can secure the horizontal portion 210 of the endplate 198 when the captive bolt is positioned in the second sections 216 of the slot 212. A transitional portion 218 of the endplate 198 can span a gap between horizontal portions 210 of adjacent end plates 198 to ensure a substantially continuous surface for the platform system.

FIG. 11C illustrates a cross sectional view of a plank 38 and a captive bolt 202. In this embodiment, the plank 38 has two slots 220 that are oriented with the longitudinal length of the plank 38. Each slot 220 has a portion that extends completely through the top plate of the plank 38 and another portion that extends partially into the top plate by a predetermined distance 222. This distance 222 is larger than the bolt head and/or the bolt head in combination with a nut or washer. Therefore, when the bolt 202 is not in use, the bolt head is completely positioned within the slot 220. The slots 220 also extend along a length 224 of the plank 38 which allows the position of the bolt 202 to vary and provide flexibility when positioning the endplates. Lastly, a series of nuts 226, 228, 230 secure the bolt 202. A first nut 226 resides in the slot 220, a T-nut 228 extends partially into the slot 220 from a bottom side, and a second nut 230 serves as an end stop to prevent the bolt 202 from being completely removed from the slot 220.

While the present disclosure has been explained and illustrated with respect to various functional features or aspects in one or more preferred embodiments, it shall be understood that the present disclosure can be modified, commensurate with the scope of the claims appended hereto. Combinations and variations will occur to persons of skill in the art, all of which are deemed within the scope of the disclosure. Further, it should be understood that each of the different concepts or aspects of the present disclosure can be considered as having separate utility. Accordingly, the present disclosure comprises a number of separate sub-combinations and combinations that have utility with respect to supporting the functions of a launch vehicle.

What is claimed is:

1. An adjustable platform system for use in assembly of a launch vehicle, comprising:
    a rotatable support, wherein the rotatable support rotates about an axis of rotation between a first raised position and a second horizontal position, the rotatable support having a first end proximate the point of rotation and a second end spaced from the first end;
    a first carrier connected to the rotatable support and defining a first interior space, wherein the first carrier moves relative to the rotatable support in a direction that is substantially parallel to the axis of rotation;
    a first plurality of planks connected to the first carrier, each plank having a first end and an opposite second end and a top plate extending between the first end and the second end defining a longitudinal axis, the top plate having an upper surface and a first edge and a second edge spaced from the first edge and the first and second edges are parallel to the longitudinal axis, a flange disposed below the second edge of the top plate and extending laterally outwardly beyond the second edge of the top plate, the flange having an upper surface and extending between the first end and the second end;
    wherein the planks in the first plurality of planks are aligned in a row with each plank in the first plurality of planks adjacent to at least one other plank with the longitudinal axis of each plank being parallel, the first edge of the top plate of at least one plank in the first plurality of planks overlaps the flange of the adjacent plank wherein a substantially continuous surface is formed between the upper surface of the top plate and the upper surface of the top plate of the adjacent plank; and
    wherein each plank of the first plurality of planks moves relative to the carrier in a direction that is substantially parallel to the axis of rotation between a first retracted position wherein at least a majority of the plank is positioned in the first interior space and a second extended position wherein at least a portion of the plank extends beyond the first interior space.

2. The system of claim 1, further comprising:
    a second carrier that is movably connected to the rotatable support, wherein the second carrier moves relative to the support in a direction that is substantially parallel to the axis of rotation;
    a second plurality of planks movably connected to the second carrier, each plank of the second plurality of planks having a first end and an opposite second end and a top plate extending between the first end and the second end defining a second longitudinal axis, the top plate of each of the second plurality of planks having an upper surface and a first edge and a second edge spaced from the first edge and the first and second edges are parallel to the second longitudinal axis, a flange disposed below the second edge of the top plate and extending laterally outwardly beyond the second edge of the top plate, the flange having an upper surface and extending between the first end and the second end;
    wherein the planks in the second plurality of planks are aligned in a row with each plank in the second plurality of planks adjacent to at least one other plank with the second longitudinal axis of each plank being parallel, the first edge of the top plate of at least one plank in the second plurality of planks overlaps the flange of the adjacent plank of the second plurality of planks wherein a substantially continuous surface is formed between the upper surface of the top plate and the upper surface of the flange of the adjacent plank; and
    wherein each plank of the second plurality of planks moves relative to the second carrier in a direction that is substantially parallel to the axis of rotation between a first retracted position wherein at least a majority of the plank is positioned in the second interior space and a second extended position wherein at least a portion of the plank extends beyond the second interior space.

3. The system of claim 2, further comprising:
    a non-rotatable horizontally oriented support, the non-rotatable support having a first end and a second end spaced from the first end;

a third carrier and a fourth carrier connected to the non-rotatable support, the third carrier defining a third interior space and the fourth carrier defining a fourth interior space;

a third plurality of planks movably connected to the third carrier, each plank of the third plurality of planks having a first end and an opposite second end and a top plate extending between the first end and the second end defining a third longitudinal axis, the top plate having an upper surface and a first edge and a second edge spaced from the first edge and the first and second edges are parallel to the third longitudinal axis, a flange disposed below the second edge of the top plate and extending laterally outwardly beyond the second edge of the top plate, the flange having an upper surface and extending between the first end and the second end;

wherein the planks in the third plurality of planks are aligned in a row with each plank in the third plurality of planks adjacent to at least on other plank with the third longitudinal axis of each plank being parallel, the first edge of the top plate of at least one plank in the third plurality of planks overlaps the flange of the adjacent plank wherein a substantially continuous surface is formed between the upper surface of the top plate and the upper surface of the top plate of the adjacent plank;

wherein each plank of the third plurality of planks moves relative to the third carrier between a first retracted position wherein at least a majority of the plank is positioned in the third interior space and a second extended position wherein at least a portion of the plank extends beyond the third interior space;

a fourth plurality of planks movably connected to the fourth carrier, each plank of the fourth plurality of planks having a first end and an opposite second end and a top plate extending between the first end and the second end defining a fourth longitudinal axis, the top plate having an upper surface and a first edge and a second edge spaced from the first edge and the first and second edges are parallel to the fourth longitudinal axis, a flange disposed below the second edge of the top plate and extending laterally outwardly beyond the second edge of the top plate, the flange having an upper surface and extending between the first end and the second end;

wherein the planks in the fourth plurality of planks are aligned in a row with each plank in the fourth plurality of planks adjacent to at least one other plank with the fourth longitudinal axis of each plank being parallel, the second edge of the top plate of at least one plank in the fourth plurality of planks overlaps the flange of the adjacent plank wherein a substantially continuous surface is formed between the upper surface of the top plate and the upper surface of the top plate of the adjacent plank, wherein each plank of the fourth plurality of planks moves relative to the fourth carrier between a first retracted position wherein at least a majority of the plank is positioned in the fourth interior space and a second extended position wherein at least a portion of the plank extends beyond the fourth interior space; and wherein when the first support is in the second horizontal position the first and second carriers are substantially co-planar with the third and fourth carriers and an opening is formed between the first and second carriers and the third and fourth carriers.

4. The system of claim 1, wherein the top plate of each plank has the upper surface and a lower surface, and wherein a friction-reducing material is disposed on either the lower surface of each top plate proximate the first edge or the upper surface of each flange.

5. The system of claim 1, wherein each plank of the first plurality of planks comprises a bottom plate spaced from the top plate and extending between the first end and the second end of each plank, the bottom plate having a first edge and a second edge spaced from the first edge, the first and second edges parallel to the longitudinal axis, the bottom plate having an upper surface and a lower surface, and further comprising:

a first plank holder secured to the first carrier, wherein the plank holder contacts the upper surface of the bottom plate of a first plank of the first plurality of planks and contacts the upper surface of the bottom plate of a second plank of the first plurality of planks to secure the first and second planks to the carrier and limit the movement of the first and second planks relative to the carrier to a linear movement.

6. The system of claim 5, further comprising:

a first glide pad affixed to the first carrier and positioned beneath the bottom plate of the first plank of the first plurality of planks, wherein the glide pad interfaces with the lower surface of the bottom plate and reduces friction between the first carrier and the first plank of the first plurality of planks when the first plank moves between the first retracted position and the second extended position.

7. The system of claim 5, further comprising:

a first plank roller affixed to the first carrier and positioned beneath the bottom plate of the first plank of the first plurality of planks, wherein the first plank roller rotatably supports the first plank as the first plank moves between the first retracted position and the second extended position.

8. An adjustable platform system for use in assembly of a launch vehicle, comprising:

a first support structure and a second support structure spaced from the first support structure;

a first carrier having an upper surface and defining a first interior space, the first carrier affixed to the first support structure wherein the top surface of the first carrier is substantially horizontal, and the first carrier moves relative to the first support structure in a substantially horizontal plane;

a first plurality of planks connected to the first carrier, wherein each plank of the first plurality of planks moves relative to the first carrier between a first retracted position wherein at least a majority of the plank is positioned in the first interior space and a second extended position wherein at least a portion of the plank extends beyond the first interior space;

a second carrier having an upper surface and defining a second interior space, the second carrier affixed to the second support structure wherein the upper surface of the second carrier is substantially horizontal and is co-planar with the upper surface of the first carrier, and the second carrier moves relative to the second support structure in the same substantially horizontal plane, a second plurality of planks connected to the second carrier, wherein each plank of the second plurality of planks moves relative to the second carrier between a first retracted position wherein at least a majority of the plank is positioned in the second interior space and a second extended position wherein at least a portion of the plank extends beyond the second interior space; and wherein an opening exists between the first and second carriers, and the first carrier and the second carrier move in a horizontal direction toward and away from each other to change the size of the opening, and wherein the first plurality of planks and the second plurality of planks move in the same horizontal direction to further change the size of the opening.

9. The system of claim 8, further comprising:

a third carrier having an upper surface and connected to the first support structure adjacent the first carrier and defining a third interior space, wherein the upper surface of the third carrier is substantially horizontal and co-planar with the upper surface of the first carrier and moves relative to the first support in the same substantially horizontal plane and is co-planar with the movement of the first carrier; and a third plurality of planks connected to the third carrier, wherein each plank of the third plurality of planks moves relative to the third carrier between a first retracted position wherein at least a majority of the plank is positioned in the third interior space and a second extended position wherein at least a portion of the plank extends beyond the third interior space.

10. The system of claim 9, further comprising:

a fourth carrier having an upper surface and connected to the second support structure adjacent the second carrier and defining a fourth interior space, wherein the upper surface of the fourth carrier is substantially horizontal and co-planar with the upper surface of the second carrier and moves relative to the second support structure in the same substantially horizontal plane and is co-planar with the movement of the second carrier; and a fourth plurality of planks connected to the fourth carrier, wherein each plank of the fourth plurality of planks moves relative to the fourth carrier between a first retracted position wherein at least a majority of the plank is positioned in the fourth interior space and a second extended position wherein at least a portion of the plank extends beyond the fourth interior space; and wherein the third carrier and the fourth carrier move in a horizontal direction toward and away from each other to change the size of the opening, and wherein the third plurality of planks and the fourth plurality of planks move in the same horizontal direction to further change the size of the opening.

11. The system of claim 8, further comprising:

a first shaft that extends along the first support structure, wherein the shaft rotates about an axis;

a first pinion gear connected to the shaft; and a first rack connected to the first carrier, wherein the rack is operably engaged with said pinion gear, and wherein rotation of the shaft about the axis in a first direction moves the first carrier toward the opening to change the size of the opening, and rotation of the shaft about the axis in a second direction moves the first carrier away from the opening.

12. The system of claim 11, further comprising:

a gearbox positioned at one end of the shaft, wherein the gearbox is configured to receive an output shaft associated with a motor, and rotation of the output shaft of the motor within the gearbox rotates the shaft.

13. The system of claim 12, wherein the motor comprises a handheld power tool.

14. The system of claim 8, further comprising:

a weldment hold-down having a first bracket connected to the first support structure and having a second bracket connected to the first carrier, wherein the first support structure has an end that extends into a corresponding recess in the second bracket to limit a vertical tilt of the first carrier relative to the first support structure.

15. An adjustable platform system for use in assembly of a launch vehicle, comprising:

a first carrier having a first upper surface and defining a first interior space, the first carrier connected to a first fixed support, wherein the first carrier moves relative to the first support;

a first plurality of planks connected to the first carrier, wherein each plank of the first plurality of planks moves relative to the first carrier between a first retracted position wherein at least a majority of each plank of the first the plurality of planks is positioned in the first interior space and a second extended position wherein at least a portion of each plank of the first plurality of planks extends beyond the first interior space;

a second carrier having a second upper surface and defining a second interior space, the second carrier connected to a second rotatable support wherein the second support rotates about an axis of rotation between a first lowered position and a second raised position, wherein when the second support is in the first lowered position the second upper surface of the second carrier is oriented in a substantially horizontal plane and is substantially co-planar with the first upper surface of the first carrier and the second carrier moves relative to the second support in a direction parallel to the axis of rotation for the second support;

a second plurality of planks connected to the second carrier, wherein each plank of the second plurality of planks moves relative to the second carrier in a direction parallel to the axis of rotation between a first retracted position wherein at least a majority of each plank of the second plurality of planks is positioned in the second interior space and a second extended position wherein at least a portion of each plank of the second plurality of planks extends beyond the second interior space; and wherein the second support is spaced from the first support to define an opening between the first support and the second support, and wherein when the second support is in the first lowered position access to the opening is blocked by the second support and second carrier and when the second support is in the second raised position access to the opening is not blocked by the second support and second carrier.

16. The system of claim 15, further comprising:

a third carrier connected to the first support and defining a third interior space, wherein the third carrier moves relative to the first support; and a third plurality of planks connected to the first carrier, wherein each plank of the third plurality of planks moves relative to the first carrier between a first retracted position wherein at least a majority of the plank is positioned in the third interior space and a second extended position wherein at least a portion of the plank extends beyond the third interior space.

17. The system of claim 16, further comprising:

a fourth carrier connected to the second support adjacent to the second carrier and defining a fourth interior space, wherein the fourth carrier moves relative to the second support in a direction parallel to the axis of rotation;

a fourth plurality of planks connected to the second carrier, wherein each plank of the fourth plurality of planks moves relative to the second carrier in a direction parallel to the axis of rotation between a first retracted position wherein at least a majority of the plank is positioned in the fourth interior space and a second extended position wherein at least a portion of the plank extends beyond the fourth interior space; and a first alignment roller extending from either the second carrier or the fourth carrier, the alignment roller having at least one roller configured to contact the other of the second carrier and fourth carrier such that the alignment roller maintains a spacing between the second and fourth carriers.

18. The system of claim 17, further comprising:
a first hold-down bracket extending from the second support between the second and fourth carriers, the hold-down bracket has at least a first roller configured to contact an upper surface of a flange extending from the second carrier and at least a second roller configured to contact an upper surface of a flange extending from the fourth carrier to limit movement relative to the second support retain the second and fourth carriers against the second support.

19. The system of claim 15, wherein the first fixed support and the second support in the first lowered position extend in a direction that is substantially perpendicular to the direction of movement of the carriers and planks.

20. The system of claim 15, further comprising:
a hydraulic system associated with the second support to move the second support between the first and second positions.

\* \* \* \* \*